(12) United States Patent
Kurosawa et al.

(10) Patent No.: US 10,199,963 B2
(45) Date of Patent: Feb. 5, 2019

(54) MOTOR DRIVING DEVICE AND MOTOR SYSTEM

(71) Applicant: RENESAS ELECTRONICS CORPORATION, Tokyo (JP)

(72) Inventors: Minoru Kurosawa, Tokyo (JP); Kichiya Itagaki, Tokyo (JP)

(73) Assignee: Renesas Electronics Corporation, Tokyo (JP)

(*) Notice: Subject to any disclaimer, the term of this patent is extended or adjusted under 35 U.S.C. 154(b) by 0 days.

(21) Appl. No.: 15/816,702

(22) Filed: Nov. 17, 2017

(65) Prior Publication Data

US 2018/0183365 A1 Jun. 28, 2018

(30) Foreign Application Priority Data

Dec. 26, 2016 (JP) .................. 2016-251304

(51) Int. Cl.
| | |
|---|---|
| H02K 29/06 | (2006.01) |
| H02P 6/10 | (2006.01) |
| H02P 6/08 | (2016.01) |
| H02P 6/15 | (2016.01) |
| H02P 6/182 | (2016.01) |
| H02P 27/14 | (2006.01) |

(52) U.S. Cl.
CPC .................. *H02P 6/10* (2013.01); *H02P 6/08* (2013.01); *H02P 6/157* (2016.02); *H02P 6/182* (2013.01); *H02P 27/14* (2013.01)

(58) Field of Classification Search
CPC .................. H02P 6/10; H02P 6/157
USPC .................. 318/400.23
See application file for complete search history.

(56) References Cited

U.S. PATENT DOCUMENTS

| | | | | |
|---|---|---|---|---|
| 7,088,063 | B2* | 8/2006 | Kurosawa | G11B 19/28 318/400.35 |
| 7,294,982 | B2* | 11/2007 | Kurosawa | G11B 19/28 318/400.17 |
| 9,007,004 | B2* | 4/2015 | Hunter | H02P 21/0003 318/400.02 |
| 2015/0145451 | A1* | 5/2015 | Semura | H02P 6/10 318/400.23 |

FOREIGN PATENT DOCUMENTS

| | | |
|---|---|---|
| JP | 2005-102447 A | 4/2005 |
| JP | 2010-288396 A | 12/2010 |

* cited by examiner

*Primary Examiner* — Erick Glass
(74) *Attorney, Agent, or Firm* — McDermott Will & Emery LLP

(57) ABSTRACT

A motor driving device and a motor system that can reduce a torque ripple of a motor are provided. The current control loop detects a drive current of the motor, detects an error between the detected value of the drive current and a current indication value as a target value of the drive current, and determines the duty of the PWM signal reflecting the error concerned. The back EMF phase detector detects the phase of a back electromotive force of each phase in the motor. The torque correction unit calculates a first torque correction coefficient of a periodic function based on the phase variations in the three phases of the back electromotive force, and corrects the current indication value superimposing the first torque correction coefficient on the current indication value.

19 Claims, 26 Drawing Sheets

FIG. 3
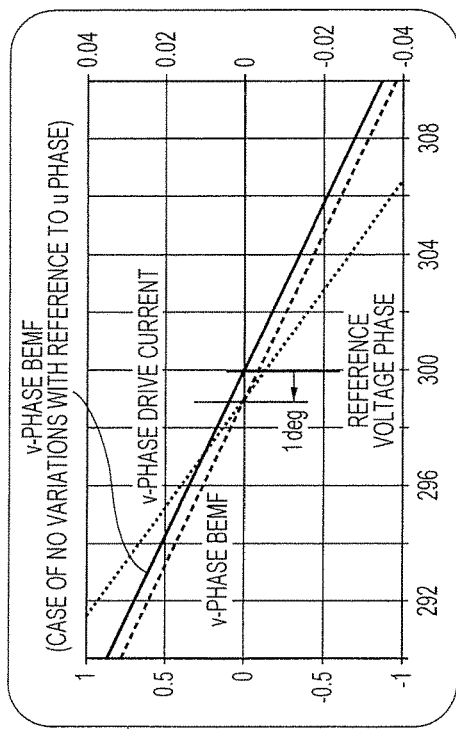
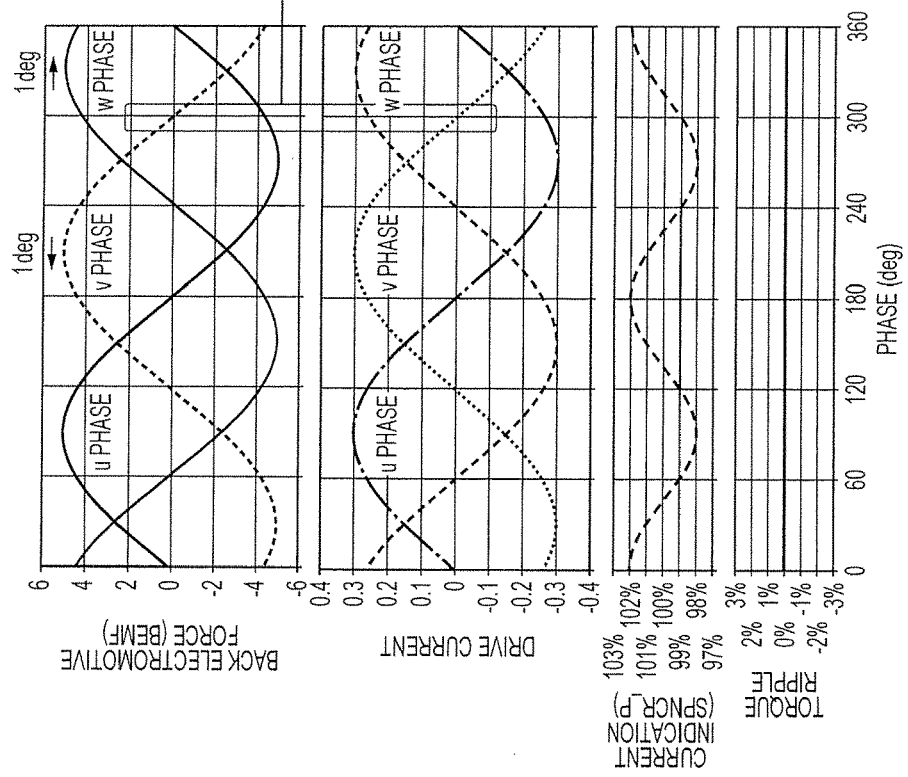

FIG. 4
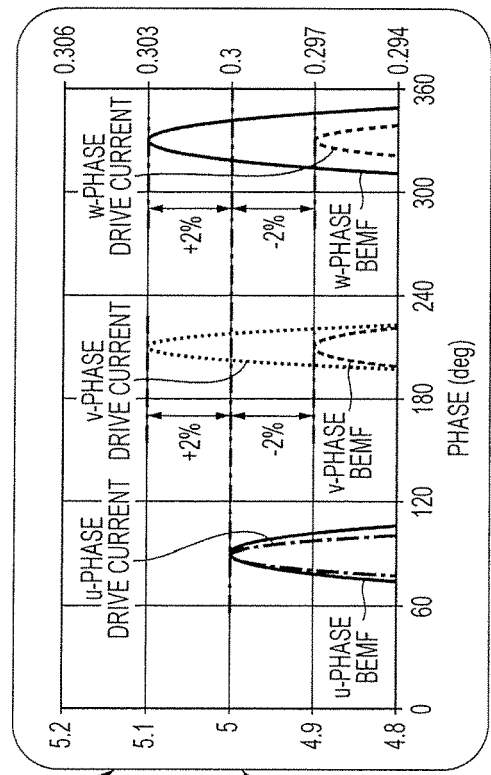
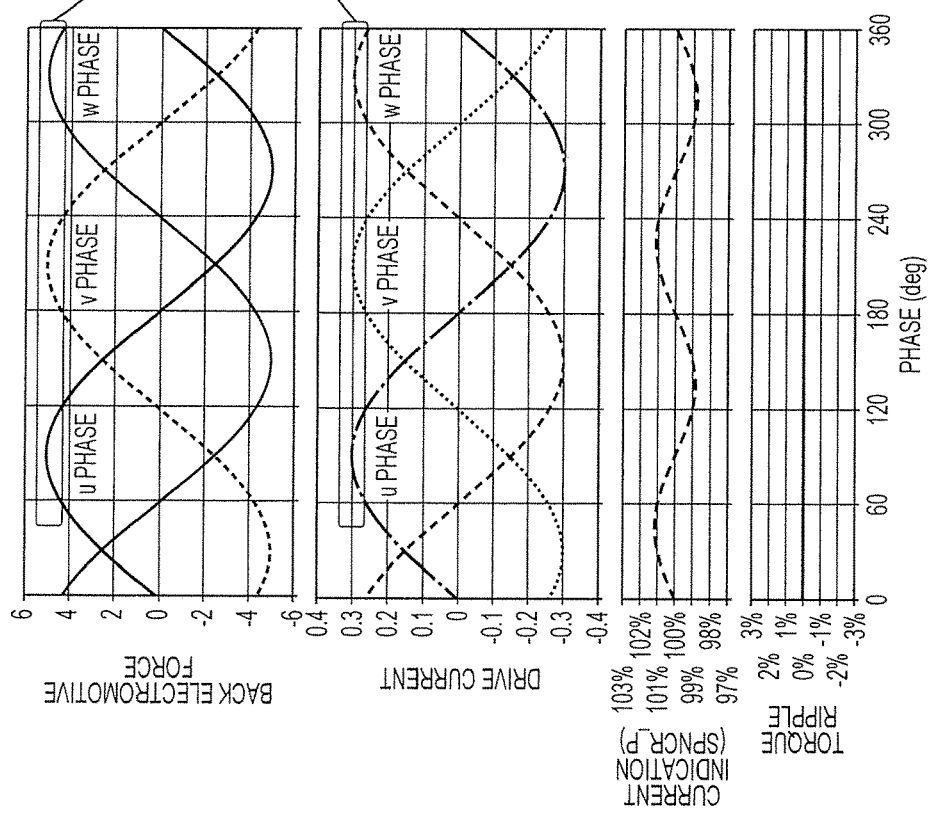

GND FIXING OF MINIMUM VOLTAGE PHASE OF SINE WAVE

POWER SUPPLY VOLTAGE (VM) FIXING OF
MAXIMUM VOLTAGE PHASE OF SINE WAVE

FIG. 26
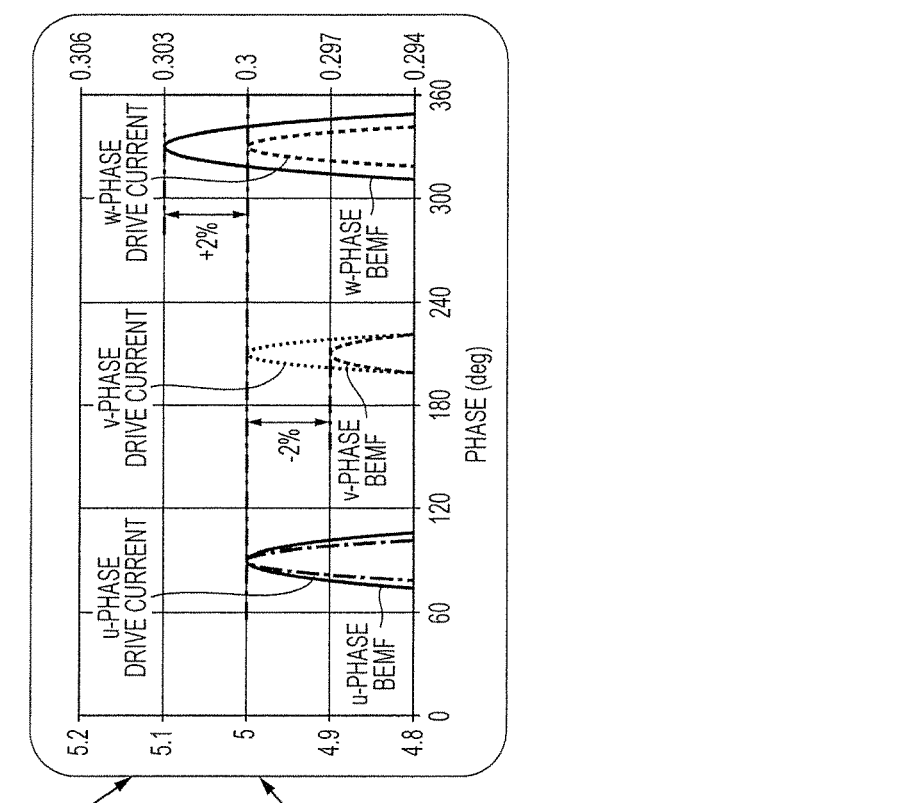
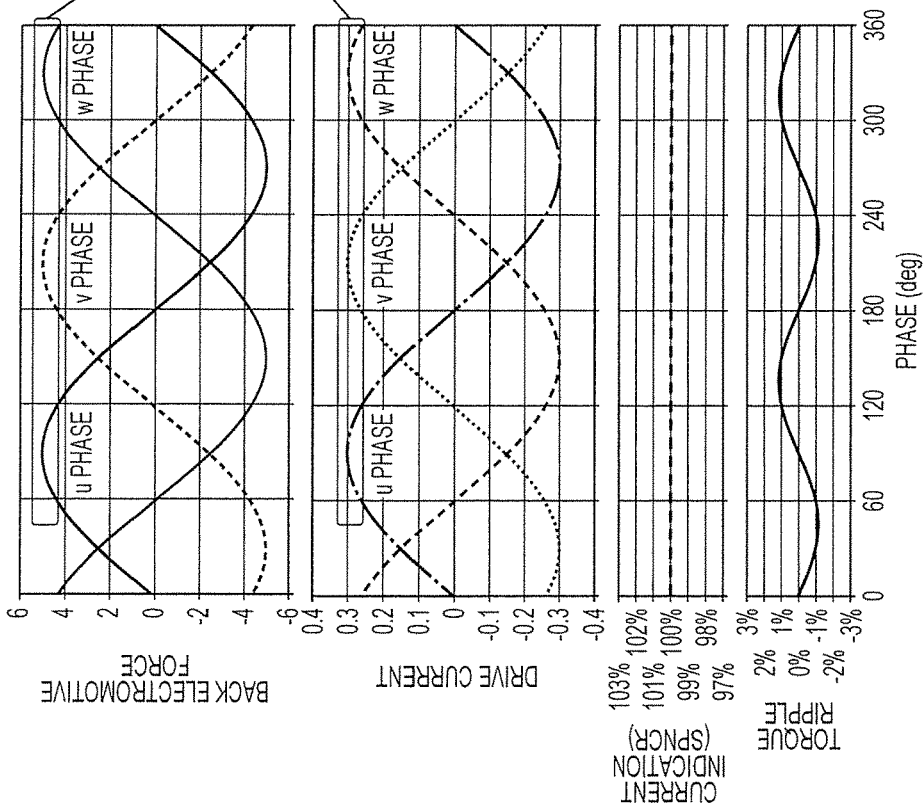

MOTOR DRIVING DEVICE AND MOTOR SYSTEM

CROSS-REFERENCE TO RELATED APPLICATIONS

The disclosure of Japanese Patent Application No. 2016-251304 filed on Dec. 26, 2016 including the specification, drawings, and abstract is incorporated herein by reference in its entirety.

BACKGROUND

The present invention relates to a motor driving device and a motor system, and relates to technology for driving a three-phase motor by a sine wave as an example.

For example, Patent Literature 1 discloses a system to calculate the phase of a drive voltage of a motor based on an arithmetic expression that employs an angular frequency, a drive current value, and characteristic constants (a torque constant and an impedance value) of the motor. Patent Literature 2 discloses a system to select one of the phase of aback electromotive force and the phase of a drive current and to control the energization timing of a motor.

(Patent Literature 1) Japanese Unexamined Patent Application Publication No. 2010-288396
(Patent Literature 2) Japanese Unexamined Patent Application Publication No. 2005-102447

SUMMARY

The sine-wave drive system using three-phase sine waves is known as a system that drives a motor with high efficiency, low noise, and low vibration. In such a drive system, in order to drive the motor with high efficiency, the phase of a drive current is adjusted so that the phase of the drive current and the phase of the back electromotive force of the motor may match. However, the drive current of the motor is generated by applying a drive voltage to the motor; accordingly, in practice, the phase of the drive current is adjusted by adjusting the phase of the drive voltage of the motor. The optimal phase of the drive voltage of the motor can be calculated based on an arithmetic expression that employs an angular frequency, a drive current value, and a characteristic constant of the motor, as disclosed by Patent Literature 1 for example.

Here, assuming an ideal motor, a motor driving device applies three-phase drive voltages having a 120-degree phase difference between the respective phases, in the condition that the phase of the drive voltage of the motor is optimized. However, an actual motor may have magnetization variations between the respective phases due to variations and restrictions in manufacturing. When the magnetization variations occur, the phase difference among three phases of the back electromotive force has variations about the reference 120 degrees, and the amplitude of the back electromotive force is not same among the three phases and has variations. When the motor driving device drives a motor with such magnetization variations by the drive voltage with the 120-degree phase difference, a torque ripple will occur. The torque ripple becomes a factor that impedes the low noise and low vibration of the motor.

The present invention described by the following embodiments has been accomplished in view of the above, and the other issues and new features of the present invention will become clear from the present description and the accompanying drawings.

A motor driving device according to one embodiment drives a three-phase motor externally provided and includes an inverter, a current control loop, a back EMF phase detector, and a torque correction unit. The inverter includes three pairs of high-side transistors and low-side transistors, respectively coupled to drive terminals of the three-phase motor. The inverter applies drive voltages serving as three-phase sine waves to the drive terminals of the three-phase motor drive terminal using a PWM signal. The current control loop detects a drive current of the motor, detects an error between the detected value of the drive current and a current indication value as a target value of the drive current, and determines the duty of the PWM signal reflecting the error concerned. The back EMF phase detector detects the phase of a back electromotive force of each phase in the motor. The torque correction unit calculates a first torque correction coefficient of a periodic function based on the phase variations in the three phases of the back electromotive force, and corrects the current indication value superimposing the first torque correction coefficient on the current indication value.

According to the one embodiment, it is possible to reduce the torque ripple of the motor.

BRIEF DESCRIPTION OF THE DRAWINGS

FIG. 3 is a waveform chart illustrating an example of back electromotive force, a drive current, a current indication value, and a torque ripple of the motor, at the time of driving the motor by the motor driving device illustrated in FIG. 2;

FIG. 4 is a waveform chart illustrating another example, different from FIG. 3, of the back electromotive force, the drive current, the current indication value, and the torque ripple of the motor;

FIG. 26 is a waveform chart illustrating another example, different from FIG. 22, of back electromotive force, a drive current, a current indication value, and a torque ripple of the motor.

DETAILED DESCRIPTION

The following embodiment is explained by being split to several sections or embodiments when it is necessary for convenience. However, except when specified clearly in particular, the divided sections or embodiments are not mutually unrelated, however, one is regarded as a modified example, details, or a supplementary explanation of some or all of the other. When the number of elements (including the number, a numerical value, an amount, a range) are referred to in the following embodiment, it is not always restricted to the specific number of elements but it may be more or less than the specific number, except when it is specified clearly and when it is theoretically and clearly restricted to the specific number.

In the following embodiment, it is needless to say that the component (including an element step) is not necessarily indispensable except when it is specified clearly and when it is theoretically thought that it is clearly indispensable. Similarly, in the following embodiment, when describing the form, positional relationship, etc., of a component, etc., what resembles to or is substantially similar to the form, etc. shall be included, except when it is clearly specified and when it is considered theoretically that it is not so. The same applies to the numerical value and the range.

Although not restricted in particular, a circuit element that configures each functional block of the embodiments is formed on a semiconductor substrate such as single crystal silicon by employing the well-known CMOS (complementary MOS transistor) integrated circuits technology.

Hereinafter, the embodiment of the present invention is described in detail, with reference to the drawings. In the entire diagrams to explain the embodiments of the present invention, the same symbol is attached to the same element in principle, and the repeated explanation thereof is omitted.

Embodiment 1

«Outline of a Motor System»

Figure 1:
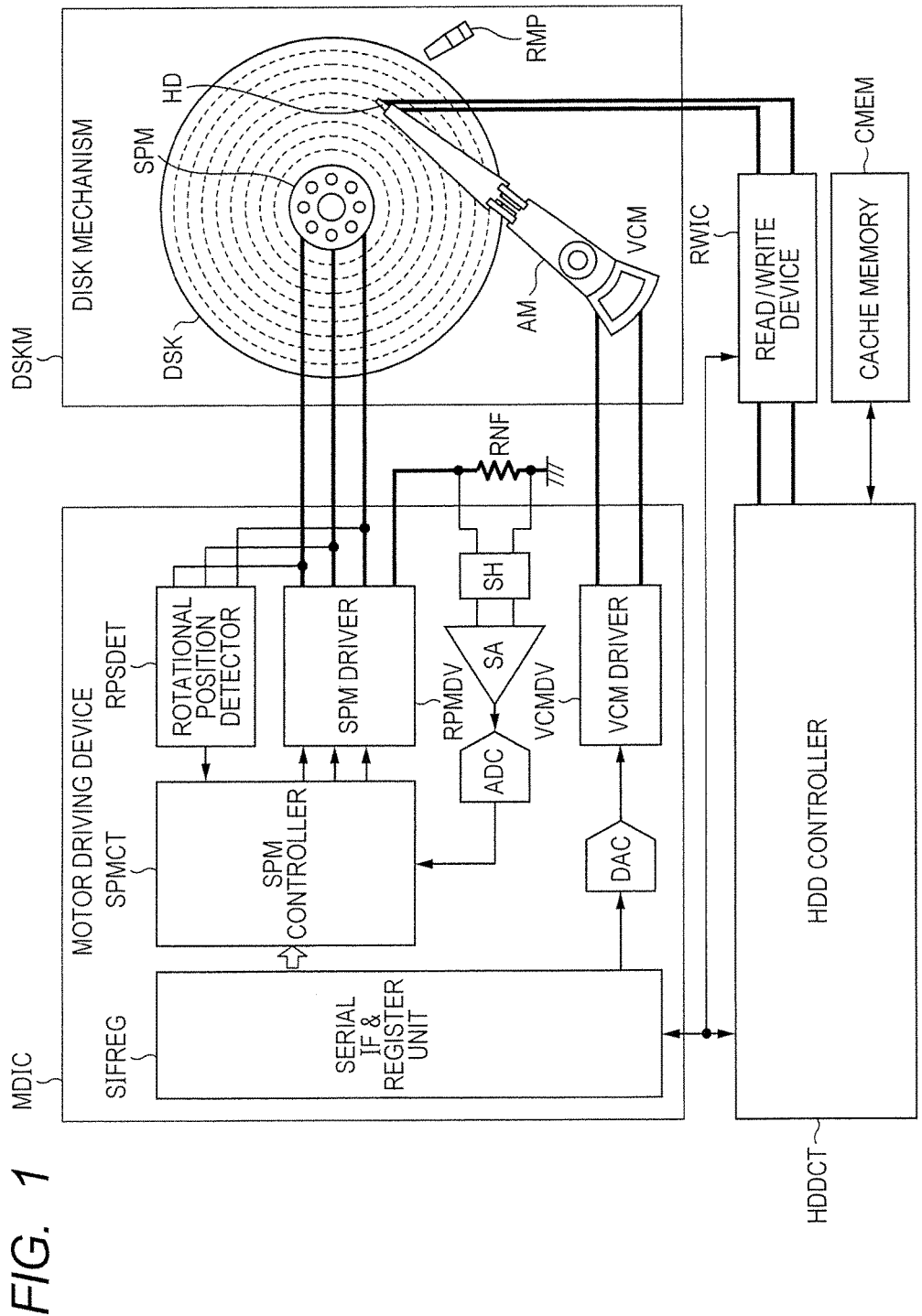
FIG. 1 is a functional block diagram illustrating an example of the outline configuration of a motor system according to Embodiment 1 of the present invention.

FIG. 1 is a functional block diagram illustrating an example of the outline configuration of a motor system according to Embodiment 1 of the present invention. FIG. 1 illustrates an example of the configuration of a hard disk device (hereinafter abbreviated as an HDD device), as an example of the motor system. The HDD device illustrated in FIG. 1 includes an HDD controller HDDCT, a cache memory CMEM, a read/write device RWIC, a motor driving device MDIC, and a disk mechanism DSKM. The HDD controller HDDCT is comprised of a system on a chip (SoC) that includes a processor, for example. The cache memory CMEM and the read/write device RWIC are comprised of respectively different semiconductor chips, for example.

The disk mechanism DSKM includes a disk (here a hard disk) DSK, a three-phase spindle motor (hereinafter abbreviated as a motor) SPM, a head HD, an arm mechanism AM, a voice coil motor VCM, and a ramp mechanism RMP. The motor SPM rotates the disk DSK. The voice coil motor VCM controls the position of the head HD in the diameter direction of the disk DSK by means of the arm mechanism AM. The head HD reads and writes data on the disk DSK at a prescribed position determined by the voice coil motor VCM. The ramp mechanism RMP serves as a retract area of the head HD when reading and writing of data are not performed.

The motor driving device MDIC is comprised of one semiconductor chip, for example. The motor driving device MDIC includes a digital-to-analogue converter DAC and a VCM driver VCMDV, to drive the voice coil motor VCM. The motor driving device MDIC includes an SPM controller SPMCT, a sample hold circuit SH, a sense amplifier circuit SA, an analog-to-digital converter ADC, an SPM driver SPMDV, and a rotational position detector RPSDET, to drive the motor SPM. The motor driving device MDIC includes a serial IF & register unit SIFREG, to set up the drive conditions of the motor SPM and the voice coil motor VCM.

The read/write device RWIC drives the head HD to make the head HD perform read/write of data. The HDD controller HDDCT controls the whole HDD device. The HDD controller HDDCT communicates with the serial IF & register unit SIFREG of the motor driving device MDIC and instructs the motor driving device MDIC about the drive conditions of the motor SPM and the voice coil motor VCM. The HDD controller HDDCT also instructs the read/write device RWIC to perform read/write of data. In this case, the write data to be instructed to the read/write device RWIC and the data read from the head HD via the read/write device RWIC are held in a cache memory CMEM.

Next, the general operation of the HDD device concerned is explained briefly. First, upon receiving a starting command of the motor SPM from the HDD controller HDDCT, the motor driving device MDIC drives the motor SPM via the SPM driver SPMDV, by means of a PWM (Pulse Width Modulation) signal generated by the SPM controller SPMCT. The current detection resistor RNF detects a drive current of the motor SPM.

The drive current of the motor SPM concerned is converted into a digital value by the sample hold circuit SH, the sense amplifier circuit SA, and the analog-to-digital converter ADC. Based on an error of a detected current value (digital value) of the drive current concerned with reference to a current indication value used as a target value of the drive current, the SPM controller SPMCT generates a PWM signal for reducing the error concerned. The current indication value is indicated by the HDD controller HDDCT, for example.

The rotational position detector RPSDET detects a rotational position of the motor SPM, by detecting a back electromotive force (referred to as BEMF in the present specification) of the motor SPM, for example. The SPM controller SPMCT outputs, to the SPM driver SPMDV, the PWM signal for bringing the drive current value of the motor SPM close to the current indication value, at an appropriate timing corresponding to the rotational position of the motor SPM. Consequently, the SPM controller SPMCT performs the rated rotation control of the motor SPM (that is, the disk DSK). After the motor SPM reaches the state of the rated rotation, the VCM driver VCMDV moves the head HD onto the disk DSK, and the head HD reads and writes data on the disk DSK.

Such a motor system is required to realize low noise and low vibration in addition to high efficiency. In particular, in a HDD device, the realization of low vibration becomes important from viewpoints of improvement in storage density and improvement in the position accuracy by servo writing, for example. Therefore, it becomes useful to employ the motor driving device according to Embodiment 1 described below.

«The Outline Configuration and Outline Operation of a Motor Driving Device (a Comparative Example (1))»

Figure 18:
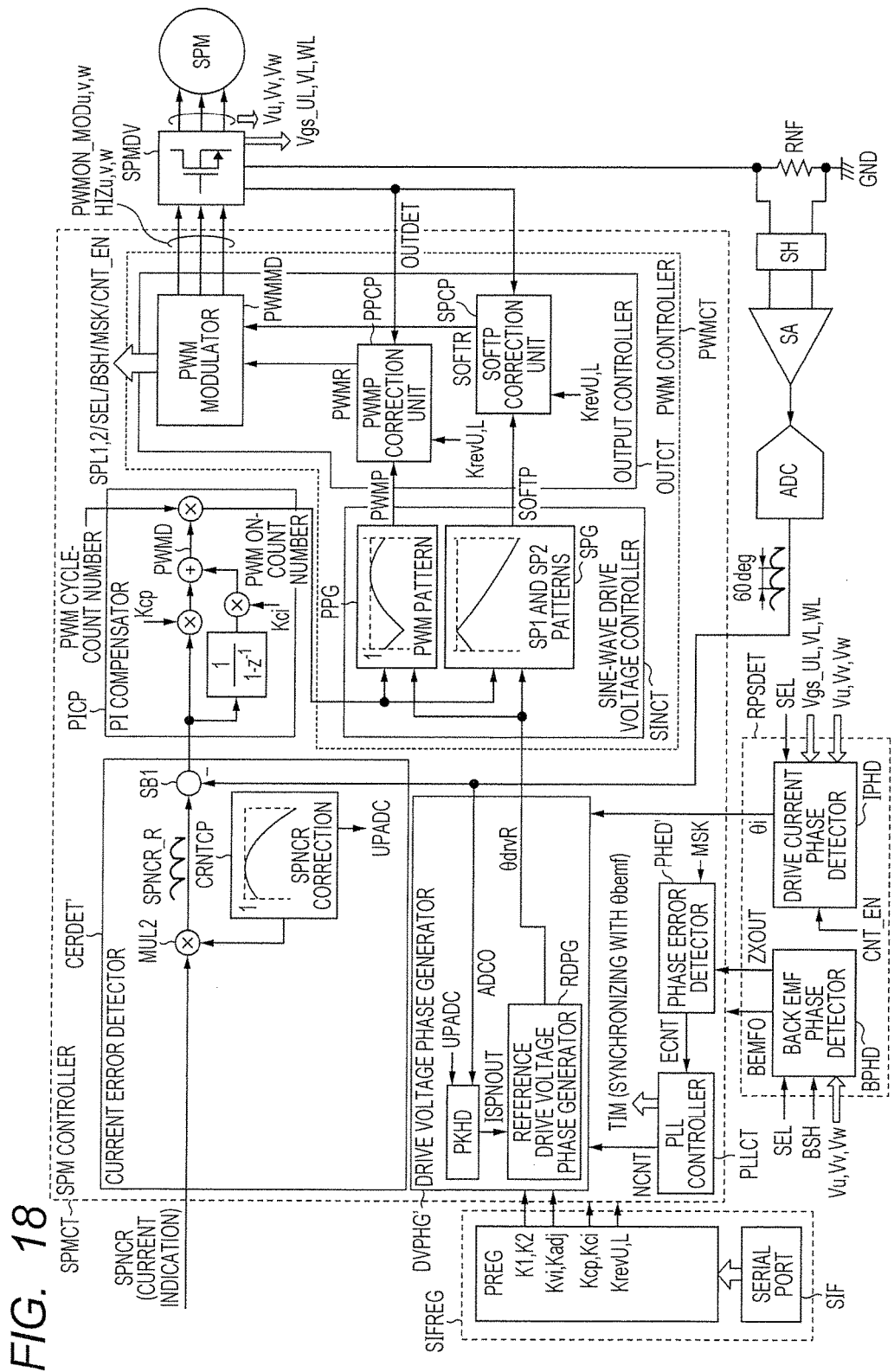
FIG. 18 is a functional block diagram illustrating an example of the configuration of the principal part of a motor driving device as a comparative example (1) of the present invention.
Figure 19:
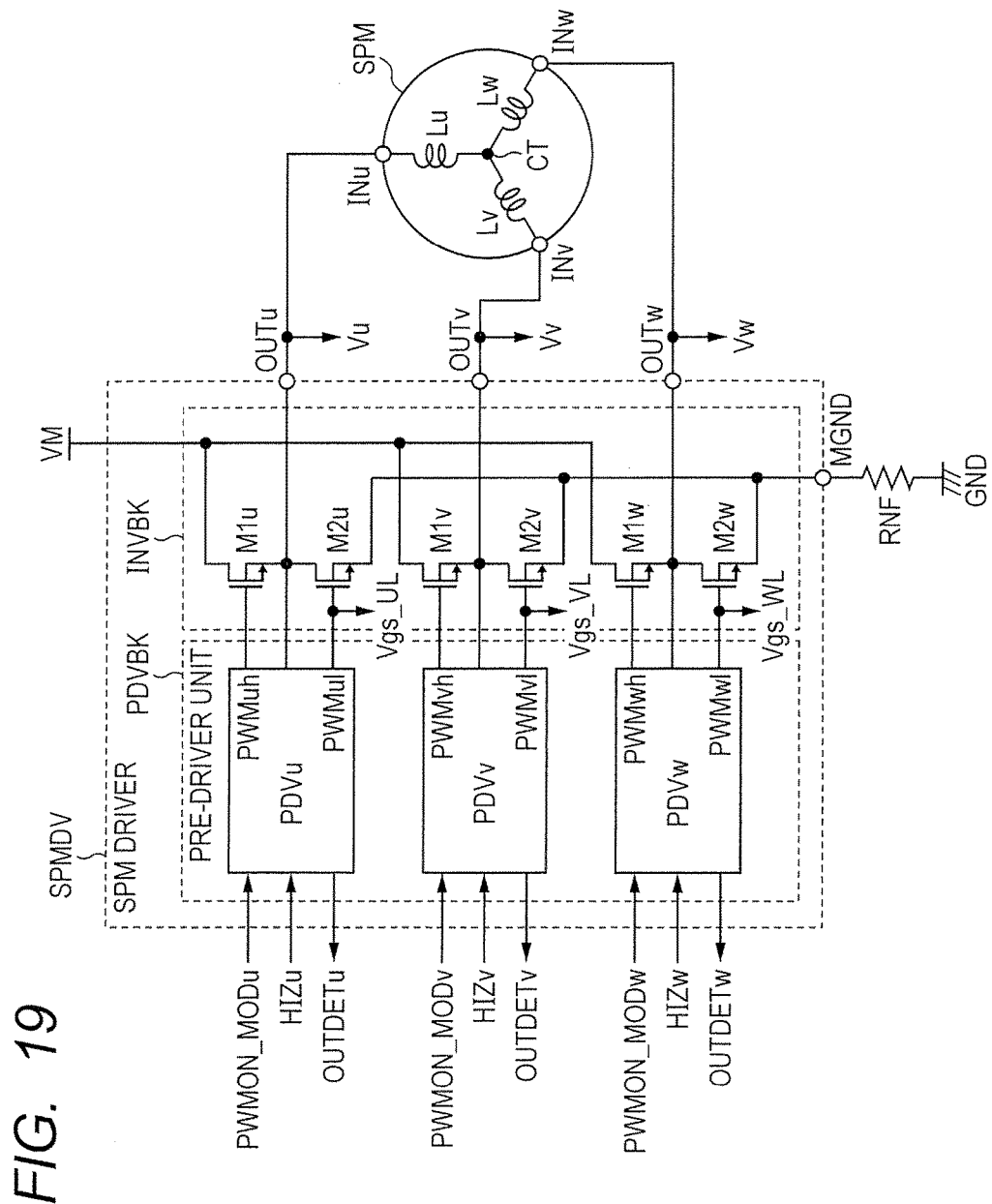
FIG. 19 is a circuit block diagram illustrating an example of the configuration of an SPM driver illustrated in FIG. 18.

First, prior to the explanation of the motor driving device according to Embodiment 1, a motor driving device as a comparative example (1) is explained. FIG. 18 is a functional block diagram illustrating an example of the configuration of the principal part of a motor driving device as the comparative example (1) of the present invention. FIG. 19 is a circuit block diagram illustrating an example of the configuration of an SPM driver illustrated in FIG. 18. FIG. 20A, FIG. 20B, FIG. 20C, FIG. 21 are explanatory drawings illustrating the principle of operation of the sine-wave drive voltage controller illustrated in FIG. 18.

FIG. 18 illustrates the SPM controller SPMCT, the SPM driver SPMDV, the rotational position detector RPSDET, the serial IF & register unit SIFREG, the sample hold circuit SH, the sense amplifier circuit SA, and the analog-to-digital converter ADC, extracted from the motor driving device MDIC illustrated in FIG. 1. In addition, FIG. 18 illustrates the current detection resistor RNF provided in the external of the motor driving device MDIC, and the motor SPM in the disk mechanism DSKM.

As described above, the current detection resistor RNF performs detection and voltage conversion of the drive current of the motor SPM, and the sample hold circuit SH holds the detection voltage concerned successively at a prescribed timing. Specifically, the sample hold circuit SH performs sampling at the timing at which a drive current of each of the three phases (u phase, v phase, w phase) of the motor SPM can be detected, and holds the detection voltage proportional to the drive current of each phase. The sense amplifier circuit SA amplifies the held detection voltage concerned, and the analog-to-digital converter ADC converts the amplified voltage concerned into a digital value.

The rotational position detector RPSDET includes a back electromotive force phase detector (hereinafter called a back EMF phase detector) BPHD and a drive current phase detector IPHD. The back EMF phase detector BPHD detects the phase of the back electromotive force (the BEMF phase) of each phase in the motor SPM. In the present example, the back EMF phase detector BPHD selects a phase as the detection target of the BEMF phase according to a phase selection signal SEL, and outputs a zero crossing detection signal ZXOUT when a voltage zero crossing point of the BEMF of the selected phase concerned is detected. The drive current phase detector IPHD detects the phase of the drive current of each phase in the motor SPM. In the present example, the drive current phase detector IPHD selects a phase as the detection target according to the phase selection signal SEL, and detects a drive current phase $\theta i$ of the selected phase concerned.

The SPM controller SPMCT includes a phase error detector PHED', a PLL (Phase Locked Loop) controller PLLCT, a drive voltage phase generator DVPHG', a current error detector CERDET', a PI compensator PICP, and a PWM controller PWMCT. The PLL controller PLLCT generates an energization timing signal TIM synchronizing with the reference BEMF phase $\theta bemf$ under the PLL control. For example, when one phase (for example, the u phase) of the three phases is assumed to be a reference phase, the BEMF phase ($\theta bemf\_U$) of the reference phase concerned serves as the reference BEMF phase $\theta bemf$.

In the present description, the explanation is made assuming that the reference phase is the u phase as an example. However, the reference phase is not restricted to the u phase but it may be the v phase or the w phase. Depending on circumstances, the reference phase may be a phase with the average of the BEMF phase of the three phases.

The phase error detector PHED' detects the error between the BEMF phase of each phase and the reference BEMF phase $\theta bemf$, based on the BEMF phase ($\theta bemf\_U$) of the reference phase detected by the back EMF phase detector BPHD (here the output timing of the zero crossing detection signal ZXOUT). Then, the phase error detector PHED' outputs a phase error signal ECNT as the detection result. In this case, the phase error detector PHED' outputs, to the PLL controller PLLCT, the phase error signal ECNT corresponding to the error between the BEMF phase ($\theta bemf\_U$) of the reference phase and the reference BEMF phase $\theta bemf$. The PLL controller PLLCT generates an energization timing signal TIM that synchronizes with the reference BEMF phase $\theta bemf$ (that is, the BEMF phase of the reference phase (θbemf_U)), by performing the PLL control so that the phase error signal ECNT may converge to zero.

Energization of the motor SPM is controlled based on this energization timing signal TIM. The PLL controller PLLCT also generates a rotational cycle count value NCNT. The rotational cycle count value NCNT is a value that is obtained by converting a time proportional to one cycle of the BEMF (that is, a rotational cycle of the motor SPM) into a count value of the reference clock in the digital control. The rotational cycle count value NCNT is inversely proportional to an angular frequency (ω) of the motor SPM.

The current error detector CERDET' detects an error between the current indication value SPNCR and the digital value outputted from the analog-to-digital converter ADC (that is, the detected current value of the drive current of each phase), with the use of a subtraction unit SB1. The current indication value SPNCR is instructed by the HDD controller HDDCT illustrated in FIG. 1, as described above. The HDD controller HDDCT receives the information on the angular frequency of the motor SPM obtained from the rotational cycle count value NCNT for example, and generates the current indication value SPNCR for setting the angular frequency concerned to a target angular frequency by a predetermined arithmetic.

The PI compensator PICP performs the proportionality integration control (PI control) with the input of the error value detected by the current error detector CERDET', and calculates a PWM duty value PWMD reflecting the current error. Then, the PI compensator PICP calculates a PWM ON-count number by multiplying the PWM duty value PWMD by the PWM cycle-count number determined in advance. The PWM cycle-count number is a number that is obtained by converting the time of one cycle of the PWM signal into the count value of the reference clock of the digital control. The PWM ON-count number is a number that is obtained by converting the ON period in one cycle of the PWM signal into the count value concerned.

The PWM controller PWMCT includes a sine-wave drive voltage controller SINCT and an output controller OUTCT. When roughly described, the PWM controller PWMCT receives an energization timing signal TIM synchronized with the reference BEMF phase θbemf from the PLL controller PLLCT, and generates PWM signals PWMON_MODu, PWMON_MODv, and PWMON_MODw for controlling the three-phase drive voltages (Vu, Vv, Vw) to be applied to the motor SPM to a sine wave shape.

The sine-wave drive voltage controller SINCT receives the PWM ON-count number from the PI compensator PICP, and generates a duty indication value for each PWM cycle, required for applying three-phase sine-wave voltages to the motor SPM. The duty indication value expresses the ratio of the ON period in the PWM cycle. Specifically, the sine-wave drive voltage controller SINCT includes a PWM pattern generator PPG to generate a duty indication value PWMP for the PWM patterns, and a soft pattern generator SPG to generate a duty indication value SOFTP for soft patterns (SP1 and SP2).

Figure 20A:
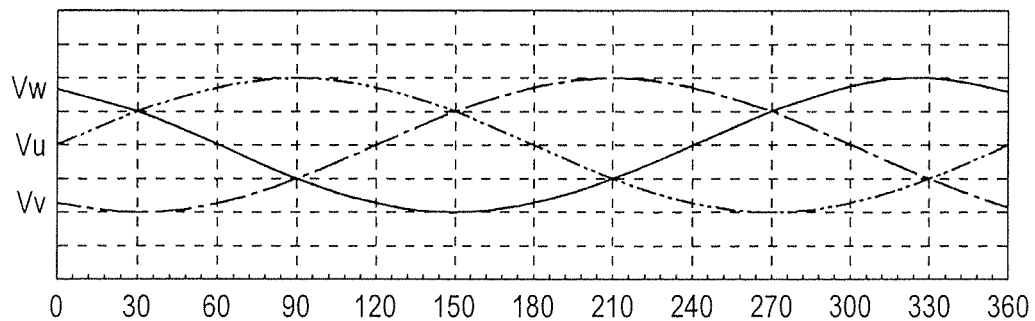
FIG. 20A, FIG. 20B, and FIG. 20C are explanatory drawings illustrating the principle of operation of a sine-wave drive voltage controller illustrated in FIG. 18.

The PWM pattern generator PPG and the soft pattern generator SPG generate the duty indication value on the principle as illustrated in FIG. 20A, FIG. 20B, FIG. 20C, and FIG. 21. First, in the case where what is called a sine-wave drive system (that is, a method to control the drive current of the motor to a sine wave shape) is applied as the drive system of the motor SPM, FIG. 20A illustrates ideal drive voltages Vu, Vv, and Vw of three phases (u phase, v phase, and w phase) applied to the motor SPM. The drive voltage Vu, Vv, and Vw concerned are sine-wave voltages that are mutually different by 120 degrees in phase.

Figure 20B:
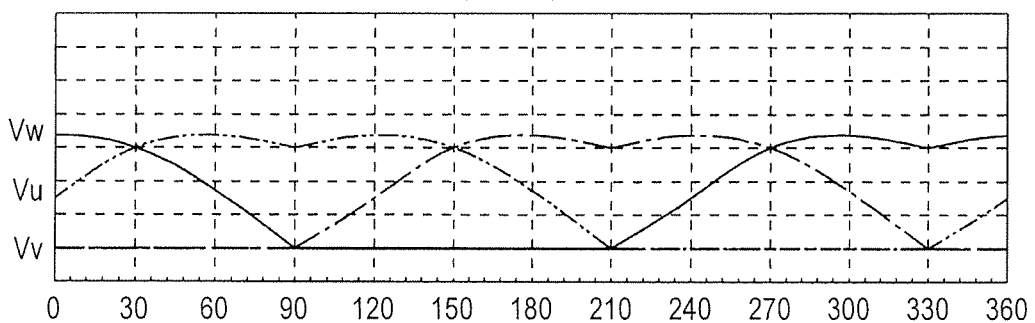

FIG. 20B illustrates the voltage waveform of each phase when a minimum voltage phase among the three-phase drive voltages Vu, Vv, and Vw illustrated in FIG. 20A is fixed to the ground power supply voltage GND (called a GND fixing in the present specification). For example, in FIG. 20A, the u phase is a minimum voltage phase in the period of electrical angles 210-330 degrees, and FIG. 20B illustrates the relative voltage waveforms of the v phase and the w phase when the GND fixing is applied to the drive voltage Vu of the u phase in the period concerned. As is the case with FIG. 20B, FIG. 20C illustrates the voltage waveform of each phase when a maximum voltage phase among the three-phase drive voltages Vu, Vv, and Vw illustrated in FIG. 20A is fixed to the supply voltage VM (called a VM fixing in the present specification).

Figure 20C:
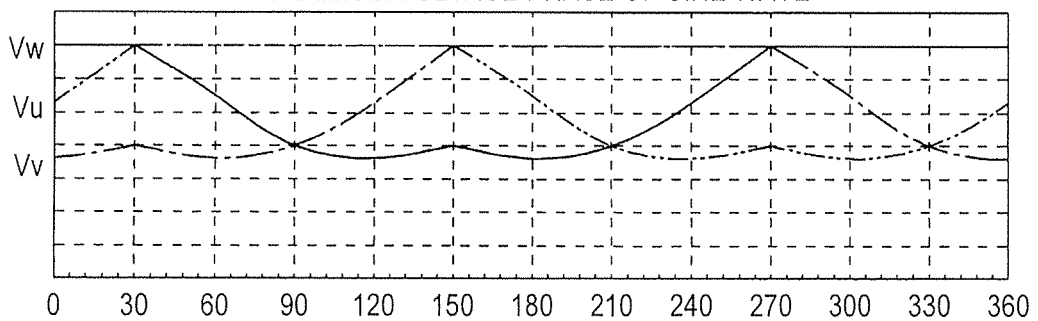
Figure 21:
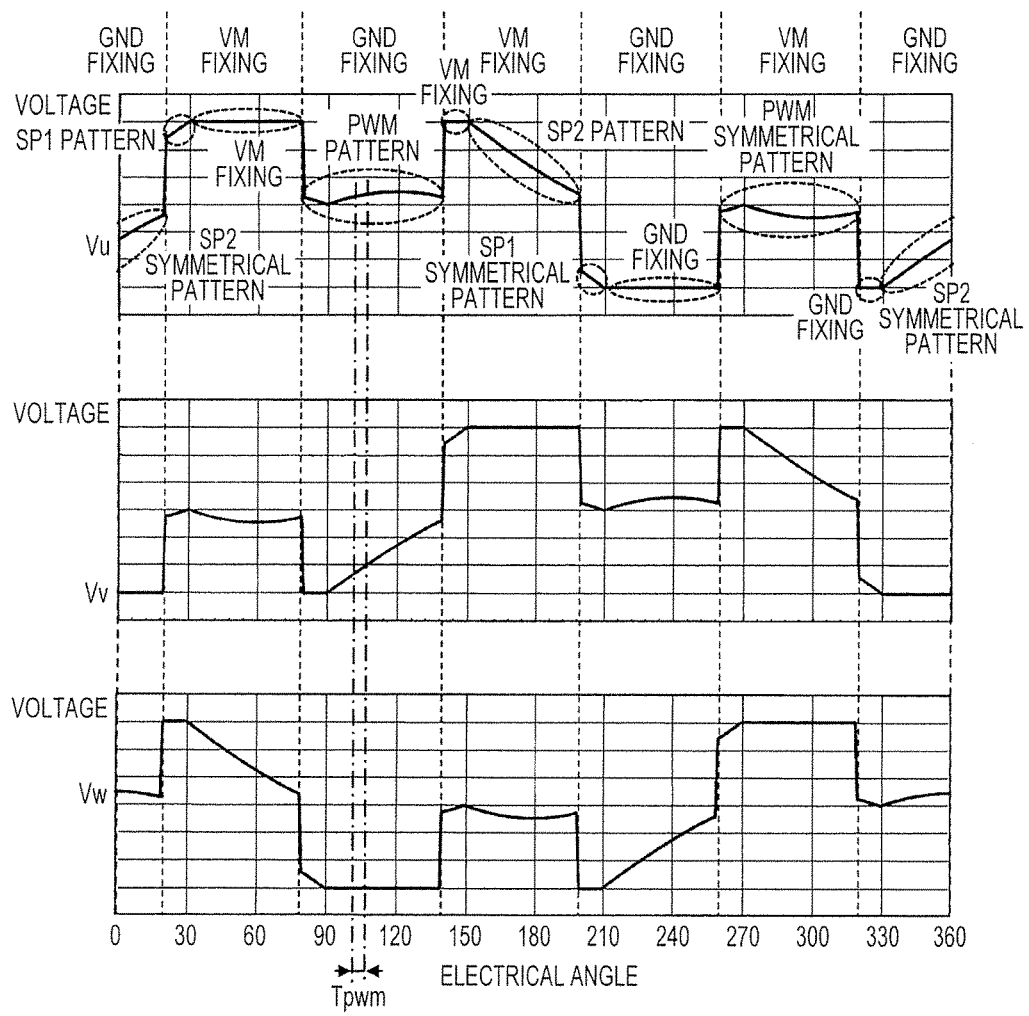
FIG. 21 is an explanatory drawing illustrating the principle of operation of the sine-wave drive voltage controller illustrated in FIG. 18.

Here, when the GND fixing illustrated in FIG. 20B and the VM fixing illustrated in FIG. 20C are switched alternately each electrical angle of 60 degrees, voltage waveforms as illustrated in FIG. 21 are obtained. As illustrated in FIG. 21, the drive voltage Vu of the u phase (same as in the v phase and the w phase) for performing sine wave driving can be generated by combining properly an SP1 pattern, a PWM pattern, an SP2 pattern, symmetrical patterns of these patterns, a VM fixing, and the GND fixing.

When explained in detail, the period of the electrical angle 0-360 degrees illustrated in FIG. 21 corresponds to the period of about 100 cycles of the PWM cycle Tpwm, for example. In the PWM cycle Tpwm illustrated in FIG. 21, in the condition that the GND fixing is applied to the w phase, the PWM pattern may be applied to the u phase and the SP2 symmetrical pattern may be applied to the v phase. Similarly, in each PWM cycle, the GND fixing or the VM fixing may be applied to one phase of the three phases, the PWM pattern or the PWM symmetrical pattern may be applied to another phase, and the SP1 pattern or SP2 pattern or these symmetrical patterns may be applied to the remaining one phase.

Based on such a principle, the PWM pattern generator PPG holds in advance on a table, etc. the duty indication value for each PWM cycle for realizing the voltage variation of the PWM pattern illustrated in FIG. 21, and generates the duty indication value PWMP based on the table concerned. The duty indication value PWMP is expressed by a count value based on the reference clock of the digital control, for example.

The table concerned holds the normalized duty indication value (for example, the count value). The PWM pattern generator PPG performs weighting based on the PWM ON-count number from the PI compensator PICP to the normalized duty indication value concerned, and generates the duty indication value PWMP. As a result, the PWM pattern generator PPG can generate the duty indication value PWMP for performing the sine wave driving of the motor SPM, after reflecting the current error described above. Similarly, the soft pattern generator SPG can also generate the duty indication value SOFTP for performing the sine wave driving of the motor SPM, after reflecting the current error.

The output controller OUTCT includes a PWMP correction unit PPCP, an SOFTP correction unit SPCP, and a PWM modulator PWMMD. The PWMP correction unit PPCP detects a duty error that occurs between the input and the output of the SPM driver SPMDV, and generates the corrected duty indication value PWMR by adding a correction value that offsets the error concerned to the duty indication value PWMP. Specifically, the PWMP correction unit PPCP detects an actual duty from the output detecting signal OUTDET from the SPM driver SPMDV, and determines a correction value based on the difference between the detected duty and the duty indication value PWMP.

Furthermore, the PWMP correction unit PPCP determines the correction value based on a prescribed arithmetic expression, when the duty indication value PWMP is greater than the duty determined by the PWM correction parameters KrevU and KrevL. That is, when the duty indication value PWMP is great, ON and OFF of a transistor become insufficient; accordingly, another correction value different from the correction value used when the duty indication value PWMP is small may be required. The PWMP correction unit PPCP determines the correction value concerned based on an arithmetic expression. As is the case with the PWMP correction unit PPCP, the SOFTP correction unit SPCP generates the corrected duty indication value SOFTR by adding a prescribed correction value to the duty indication value SOFTP.

In this way, it is possible to reduce the distortion of the sine-wave voltage (the sine-wave current generated consequently) to be applied to the motor SPM, by correcting the error of the duty that occurs between the input and the output of the SPM driver SPMDV. As the consequence of reducing the distortion, it is possible to reduce the torque ripple of the motor and to achieve low noise and low vibration of the motor.

The PWM modulator PWMMD controls the energization to the actual motor SPM, based on the energization timing signal TIM supplied from the PLL controller PLLCT. Specifically, the PWM modulator PWMMD performs switching of the GND fixing and the VM fixing every 60 degrees, as illustrated in FIG. 21. Responding to this switching, the PWM modulator PWMMD generates PWM signals PWMON_MODu, PWMON_MODv, and PWMON_MODw, respectively for the u phase, the v phase, and the w phase, based on the corrected duty indication values PWMR and SOFTR.

In detail, in each PWM cycle, the PWM modulator PWMMD fixes the PWM signal of one of three phases in the ON period or the OFF period (that is, setting as the VM fixing or the GND fixing), based on the drive system illustrated in FIG. 21. The PWM modulator PWMMD sets the ON period of the PWM signal of another phase based on one of the corrected duty indication values PWMR and SOFTR, and sets the ON period of the PWM signal of the remaining one phase based on the other of the corrected duty indication values PWMR and SOFTR. In practice, each of the symmetrical patterns of the PWM pattern and the soft pattern is also needed, as illustrated in FIG. 21. The PWM modulator PWMMD also generates the PWM signal corresponding to each of the symmetrical patterns by digital calculation.

In order to detect the BEMF phase by the back EMF phase detector BPHD, it is necessary to control temporarily the u phase, the v phase, and the w phase of the motor SPM to a high impedance in the neighborhood of the voltage zero crossing point. The PWM modulator PWMMD generates a high impedance control signals HIZu, HIZv, and HIZw, in order to control temporarily the u phase, the v phase, and the w phase to a high impedance. In this case, the PWM modulator PWMMD generates a mask signal MSK in the period when one of the phases is controlled to a high impedance (in other words, the detection period of the BEMF phase), and outputs the generated mask signal MSK to the phase error detector PHED'. The phase error detector PHED' detects a phase error utilizing the mask signal MSK concerned (the details will be described below in FIG. 8).

In this way, by employing the drive system illustrated in FIG. 21, the PWM modulator PWMMD is required to include not three but two real circuits that generate the PWM signal based on the corrected duty indication value (count value). Accordingly, it is possible to attain the reduction of the circuit area. By employing the drive system illustrated in FIG. 21, it is possible to perform control with respect to the amplitude from the VM fixing or the GND fixing; accordingly, it is advantageous with respect to the supply voltage margin. Accordingly, it is possible to enlarge the torque constant of the motor SPM and to reduce the power consumption.

As illustrated in FIG. 19, The SPM driver SPMDV includes a pre-driver unit PDVBK and an inverter INVBK. The inverter INVBK includes a high-side transistor M1$u$ and a low-side transistor M2$u$ for the u phase, a high-side transistor M1$v$ and a low-side transistor M2$v$ for the v phase, and a high-side transistor M1$w$ and a low-side transistor M2$w$ for the w phase. Although not restricted in particular, the high-side transistors M1$u$, M1$v$, and M1$w$ and the low-side transistors M2$u$, M2$v$, and M2$w$ employ an n-channel MOS transistor here.

Drains of the high-side transistors M1$u$, M1$v$, and M1$w$ are coupled to the supply voltage VM in common, and sources of the low-side transistors M2$u$, M2$v$, and M2$w$ are coupled to the motor ground terminal MGND in common. A source of the high-side transistor M1$u$ and a drain of the low-side transistor M2$u$ are coupled to a drive output terminal OUTu for the u phase. Similarly, a source of the high-side transistor M1$v$ and a drain of the low-side transistor M2$v$ are coupled to a drive output terminal OUTv for the v phase, and a source of the high-side transistor M1$w$ and a drain of the low-side transistor M2$w$ are coupled to a drive output terminal OUTw for the w phase. The motor ground terminal MGND is coupled to the ground power supply voltage GND via the current detection resistor RNF.

The drive output terminals (motor drive terminals) OUTu, OUTv, and OUTw for the u phase, the v phase, and the w phase are respectively coupled to driving input terminals INu, INv, and INw for the u phase, the v phase, and the w phase of the motor SPM. Drive voltages Vu, Vv, and Vw of the u phase, the v phase, and the w phase are outputted from the drive output terminals OUTu, OUTv, and OUTw for the u phase, the v phase, and the w phase, respectively. The drive voltages Vu, Vv, and Vw become voltage waveforms as illustrated in FIG. 21 when looked at in a time average, and become a PWM signal when observed at each time. The motor SPM includes coils Lu, Lv, and Lw for the u phase, the v phase, and the w phase that are star-connected equivalently between a neutral point CT and the driving input terminals INu, INv and INw, respectively.

The pre-driver unit PDVBK includes pre-drivers PDVu, PDVv, and PDVw for the u phase, the v phase, and the w phase, respectively. Based on a PWM signal PWMON_MODu for the u phase supplied from the PWM modulator PWMMD, the pre-driver PDVu for the u phase drives the high-side transistor M1$u$ for the u phase by a PWM signal PWMuh, and the low-side transistor M2$u$ by a PWM signal PWMul as a complementary signal of the PWM signal PWMuh.

The pre-driver PDVu concerned drives both of the high-side transistor M1$u$ and the low-side transistor M2$u$ to an OFF state, when the high impedance control signal HIZu is at a high level. Accordingly, the drive output terminal OUTu becomes a high impedance and it becomes possible to observe the BEMF of the u phase at the drive output terminal OUTu. The pre-driver PDVu concerned converts the PWM signal outputted from the drive output terminal OUTu into a pulse signal of a prescribed voltage level, and outputs the pulse signal concerned as an output detecting signal OUTDETu described above. Although detailed explanation is omitted, the same applies to the pre-driver PDVv for the v phase and to the pre-driver PDVw for the w phase.

Here, returning to FIG. 18, the current detection resistor RNF can detect the phase current of the phases each different by 60 degrees. For example, in the period of 0-60 degrees illustrated in FIG. 20A (the period when the electric current flows from the u phase and the w phase toward the v phase), it is possible to detect the phase current of the v phase. In the period of 60-120 degrees (the period when the electric current flows from the u phase toward the v phase and the w phase), it is possible to detect the phase current of the u phase. The phase current detected in this way becomes an electric current of a repeated cycle of 60 degrees including a peak of the sine wave.

Therefore, in order to improve the detection accuracy of the error by the subtraction unit SB1, the current error detector CERDET' includes an indicating current correction unit CRNTCP to generate a digital pattern that reproduces this sinusoidal wave. At the time of the steady rotation of the motor SPM for example, the current error detector CERDET' multiplies the almost constant current indication value SPNCR by the digital pattern outputted from the indicating current correction unit CRNTCP with the aid of the multiplier MUL2. Then, the current error detector CERDET' outputs the current indication value SPNCR_R as the multiplication result concerned to the subtraction unit SB1. The subtraction unit SB1 detects the error between the current indication value SPNCR_R and the digital value ADCO outputted from the analog-to-digital converter ADC. Although not restricted in particular, the digital value ADCO is outputted for each cycle of the PWM signal, for example.

The drive voltage phase generator DVPHG' includes a peak holding unit PKHD and a reference drive voltage phase generator RDPG. The peak holding unit PKHD holds a digital value ADCO outputted from the analog-to-digital converter ADC in response to a trigger signal UPADC supplied from the indicating current correction unit CRNTCP, and outputs a drive current amplitude ISPNOUT of each phase. The indicating current correction unit CRNTCP outputs the trigger signal UPADC at the position of the maximum amplitude of the digital pattern to generate, for example.

The reference drive voltage phase generator RDPG determines the reference drive voltage phase θdrvR when the drive voltage is applied to the motor drive terminals (the drive output terminals OUTu, OUTv, and OUTw), so that the phase difference between the drive current phase θi detected by the drive current phase detector IPHD and the reference BEMF phase θbemf is set as zero. When explained in detail, normally, in the motor SPM, in order to match the BEMF phase and the drive current phase, it is required to perform the control in which the drive voltage is applied to the motor SPM with the phase leading from the BEMF phase by the drive voltage phase θdrvR (called the leading angle control). The reference drive voltage phase generator RDPG determines the drive voltage phase θdrvR applicable to the three phases in common, assuming an ideal motor SPM without magnetization variations. The reference drive voltage phase generator RDPG instructs the drive voltage phase θdrvR determined, to the PWM controller PWMCT.

The PWM controller PWMCT receives the drive voltage phase θdrvR, and shifts the energization timing signal TIM based on the drive voltage phase θdrvR, and generates the PWM signals PWMON_MODu, PWMON_MODv, and PWMON_MODw for controlling the three-phase drive voltages to a sine wave shape, based on the energization timing signal after the shift concerned. For example, the sine-wave drive voltage controller SINCT shifts the PWM pattern and the soft pattern illustrated in FIG. 21, by the electrical angle based on the drive voltage phase θdrvR, and generates the duty indication values PWMP and SOFTP with the use of this shifted pattern. Consequently, the phase of the drive voltages Vu, Vv, and Vw is controlled based on the drive voltage phase θdrvR. Corresponding to this control, the drive current phase in each phase of the motor SPM is also controlled based on the drive voltage phase θdrvR.

The serial IF & register unit SIFREG includes a serial port SIF and a parameter setting register PREG that can be accessed via the serial port SIF concerned. The parameter setting register PREG holds the various parameters set up by the HDD controller HDDCT illustrated in FIG. 1, for example. Here, the various parameters include characteristic constants K1 and K2 of the motor SPM, gain adjustment parameters Kvi and Kadj, current control parameters Kcp and Kci, and PWM correction parameters KrevU and KrevL.

The characteristic constants K1 and K2, the gain adjustment parameters Kvi and Kadj are employed by the drive voltage phase generator DVPHG'. The current control parameters Kcp and Kci are employed as a proportional gain and an integration gain of the PI control in the PI compensator PICP. The PWM correction parameters KrevU and KrevL are employed by the PWMP correction unit PPCP and the SOFTP correction unit SPCP, as described above.

«Points at Issue about the Motor Driving Device (the Comparative Example (1)»

Figure 22:
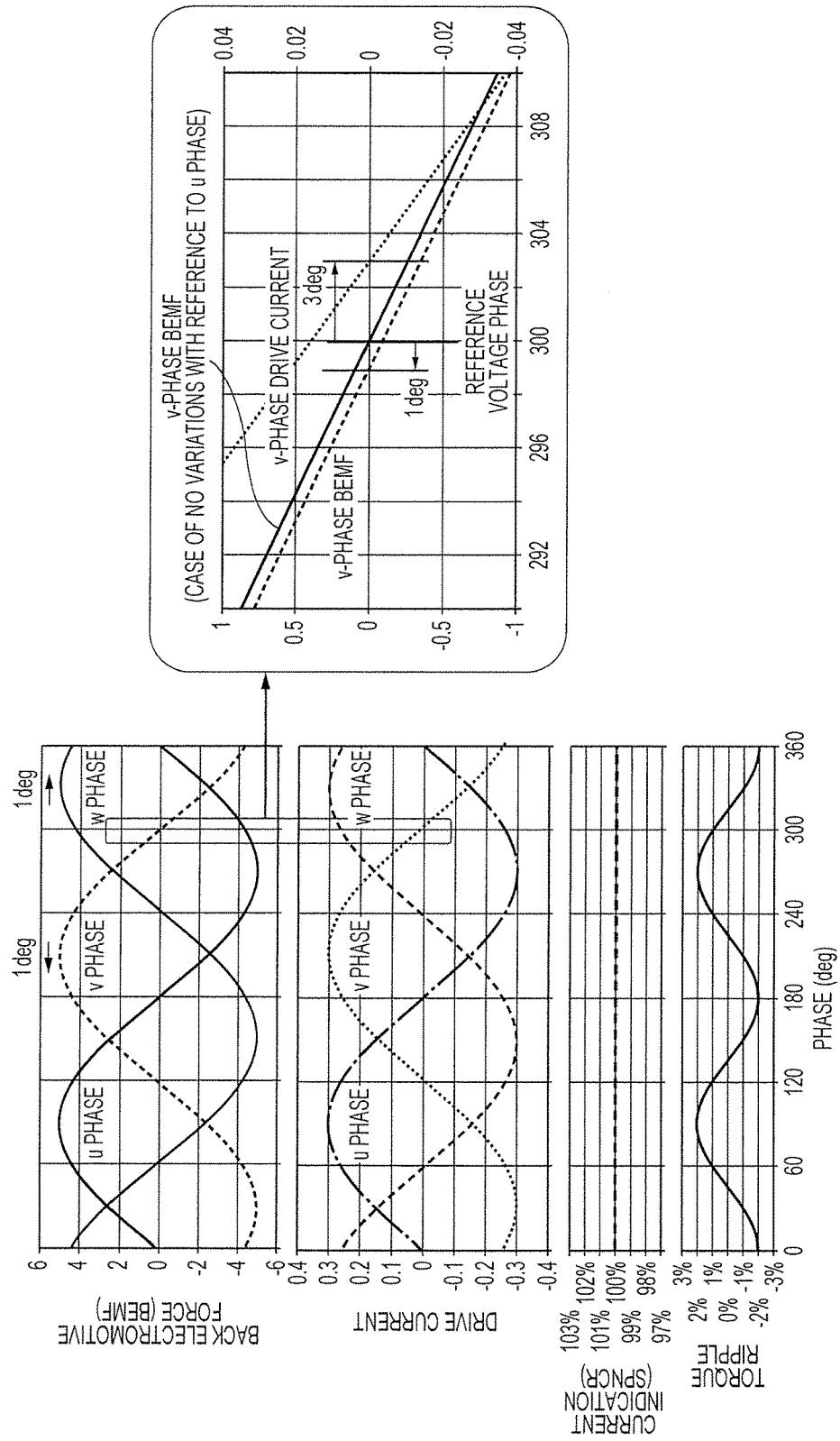
FIG. 22 is a waveform chart illustrating an example of back electromotive force, a drive current, a current indication value, and a torque ripple of a motor at the time of driving the motor by the motor driving device illustrated in FIG. 18.

FIG. 22 is a waveform chart illustrating an example of back electromotive force, a drive current, a current indication value, and a torque ripple of a motor at the time of driving the motor by the motor driving device illustrated in FIG. 18. The BEMF of the ideal motor SPM is a sine-wave voltage that is shifted by every 120 degrees for the u phase, the v phase, and the w phase. However, the BEMF phase of an actual motor SPM may vary with reference to the BEMF phase of the ideal motor SPM, as shown in FIG. 22.

In the example illustrated in FIG. 22, relative to the BEMF phase of the u phase as the reference BEMF phase θbemf (θbemf_U) described above, the BEMF phase (θbemf_V) of the v phase leads by one degree, and the BEMF phase (θbemf_W) of the w phase lags by one degree. Such variations of the BEMF phase among the phases are called magnetization variations, and they mainly originate in the structure of the motor SPM. A factor of the variations in a brushless DC motor for example is the physical arrangement error (position shift in the direction of rotation) of the u phase, the v phase, and the w phase in the stator.

In the motor driving device illustrated in FIG. 18, the drive voltage phase θdrvR is determined common to each phase, assuming the ideal motor described above. When magnetization variations occur in the BEMF phase on that assumption, the drive current phase may also exhibit variations. Although the details will be described in FIG. 23, FIG. 24A, FIG. 24B, FIG. 24C, when the BEMF phase varies in the leading direction, the drive current phase varies in the lagging direction. On the contrary, when the BEMF phase varies in the lagging direction, the drive current phase varies in the leading direction. As a specific example, as illustrated in FIG. 22, when the BEMF phase of the v phase leads by one degree, the drive current phase of the v phase may lag by about three degrees. Consequently, a torque ripple acting as the second-order component (twofold frequency) of the BEMF arises, and there arises a possibility of causing increase of noise and vibration in the motor drive.

Figure 23:
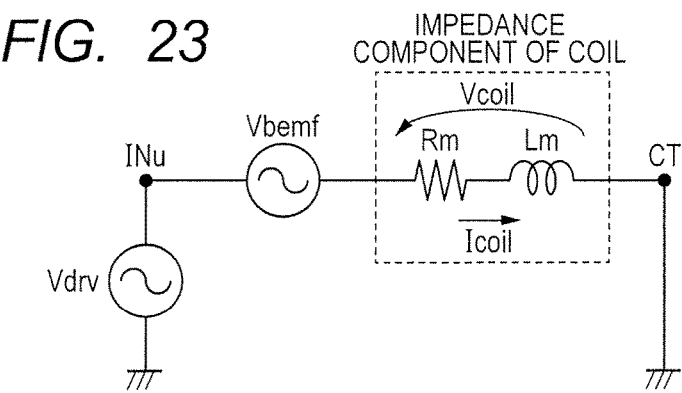
FIG. 23 is an equivalent circuit diagram illustrating each phase of the motor.
Figure 24A:
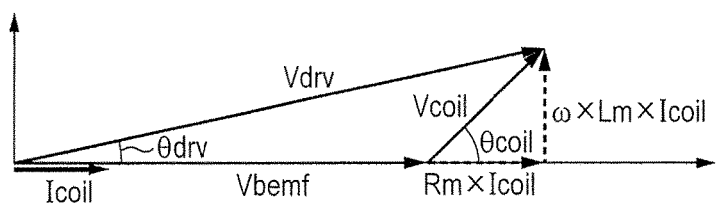
FIG. 24A, FIG. 24B, and FIG. 24C are explanatory drawings supplementing FIG. 23 and illustrating how a drive current phase varies in connection with the variations in the back EMF phase.
Figure 24B:
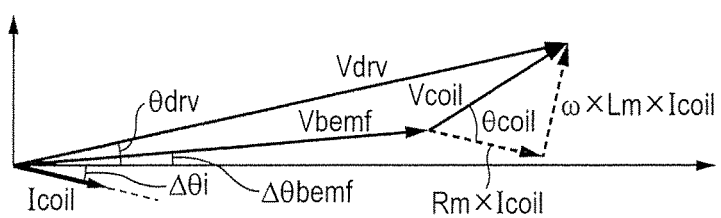
Figure 24C:
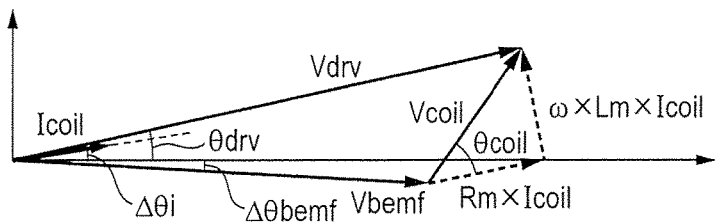

FIG. 23 is an equivalent circuit diagram illustrating each phase of the motor. FIG. 24A, FIG. 24B, and FIG. 24C are explanatory drawings illustrating how a drive current phase varies in connection with the variations in the back EMF phase, as supplementary drawings to FIG. 23. As illustrated in FIG. 23, each phase (the u phase as a representative) of the motor SPM is expressed in terms of a back electromotive force Vbemf, a motor resistance Rm, and a motor inductance Lm that are coupled in series between the driving input terminal INu and the neutral point CT. The motor resistance Rm and the motor inductance Lm express the actual impedance components of the coil Lu illustrated in FIG. 19. The motor driving device applies the drive voltage Vdrv (for example, the u phase drive voltage Vu) to such a series circuit, and makes the drive current Icoil (for example, the u phase drive current Iu) flow through the coil (Rm and Lm).

FIG. 24A is a vector diagram when the BEMF phase is not shifted relatively (in the case of the ideal motor), and corresponds to the u phase of FIG. 22 used as the reference BEMF phase, for example. When there is no phase shift, the phase of the drive current Icoil (the drive current phase) matches with the phase of the back electromotive force Vbemf (the BEMF phase) under the control of the drive voltage phase generator DVPHG' illustrated in FIG. 18. The amplitude of the drive voltage Vdrv and the drive voltage phase θdrv are determined by the vector addition of the back electromotive force Vbemf and the coil voltage Vcoil. The amplitude and the phase θcoil of the coil voltage Vcoil are determined by the vector addition of "Rm×Icoil" and "ω×Lm×Icoil" (ω is a rotational frequency (angular frequency) of the motor).

FIG. 24B is a vector diagram when the BEMF phase is leading relatively, and corresponds to the v phase of FIG. 22, for example. When the phase of the drive voltage Vbemf (the BEMF phase) leads by Δθbemf with reference to FIG. 24A, first, the amplitude of the coil voltage Vcoil becomes smaller and the drive current Icoil also becomes smaller. Accordingly, the amplitude of the coil voltage Vcoil and the drive current Icoil is restored to the same magnitude as in FIG. 24A, by the current control described in FIG. 18. Consequently, as shown in FIG. 24B, the amplitude of the drive voltage Vdrv becomes larger and the drive current phase lags by Δθi.

FIG. 24C is a vector diagram when the BEMF phase lags relatively, and corresponds to the w phase of FIG. 22, for example. When the BEMF phase lags by Δθbemf, first, the amplitude of the coil voltage Vcoil becomes larger and the drive current Icoil becomes larger. Accordingly, the amplitude of the coil voltage Vcoil and the drive current Icoil is restored to the same magnitude as in FIG. 24A, by the current control described in FIG. 18. Consequently, as shown in FIG. 24C, the amplitude of the drive voltage Vdrv becomes smaller and the drive current phase leads by Δθi.

FIG. 26 is a waveform chart illustrating another example, different from FIG. 22, of back electromotive force, a drive current, a current indication value, and a torque ripple of the motor. The amplitude of the back electromotive force (the BEMF amplitude) at the time of using the ideal motor SPM becomes a sine-wave voltage with the same amplitude for the u phase, the v phase, and the w phase. However, the BEMF amplitude at the time of using an actual motor SPM may vary with reference to the BEMF phase at the time of using the ideal motor SPM, as shown in FIG. 26.

In the example illustrated in FIG. 26, the BEMF amplitude of the v phase is reduced by 2% and the BEMF amplitude of the w phase is increased by 2%, with reference to the BEMF amplitude of the u phase. Such variations of the BEMF amplitude among the phases are also called magnetization variations, and they mainly originate in the structure of the motor SPM. A factor of the variations includes inductance variations of the coil of each phase in the stator and the characteristic variations of the magnet in the rotor.

On the other hand, the motor driving device illustrated in FIG. 18 performs control to make flow the drive current with the same amplitude in each phase, by applying the drive voltage of the same amplitude that reflects the current indication value SPNCR_R in each phase, assuming the ideal motor. However, when the drive current amplitude of each phase is controlled to be same in the state where the BEMF amplitude differs, there arises a situation where the torques in the three phases differ. Consequently, a torque ripple acting as the second-order component (twofold frequency) of the BEMF arises, and there arises a possibility of causing increase of noise and vibration in the motor drive.

«The Outline Configuration and the Outline Operation of the Motor Driving Device (Embodiment 1)»

Figure 2:
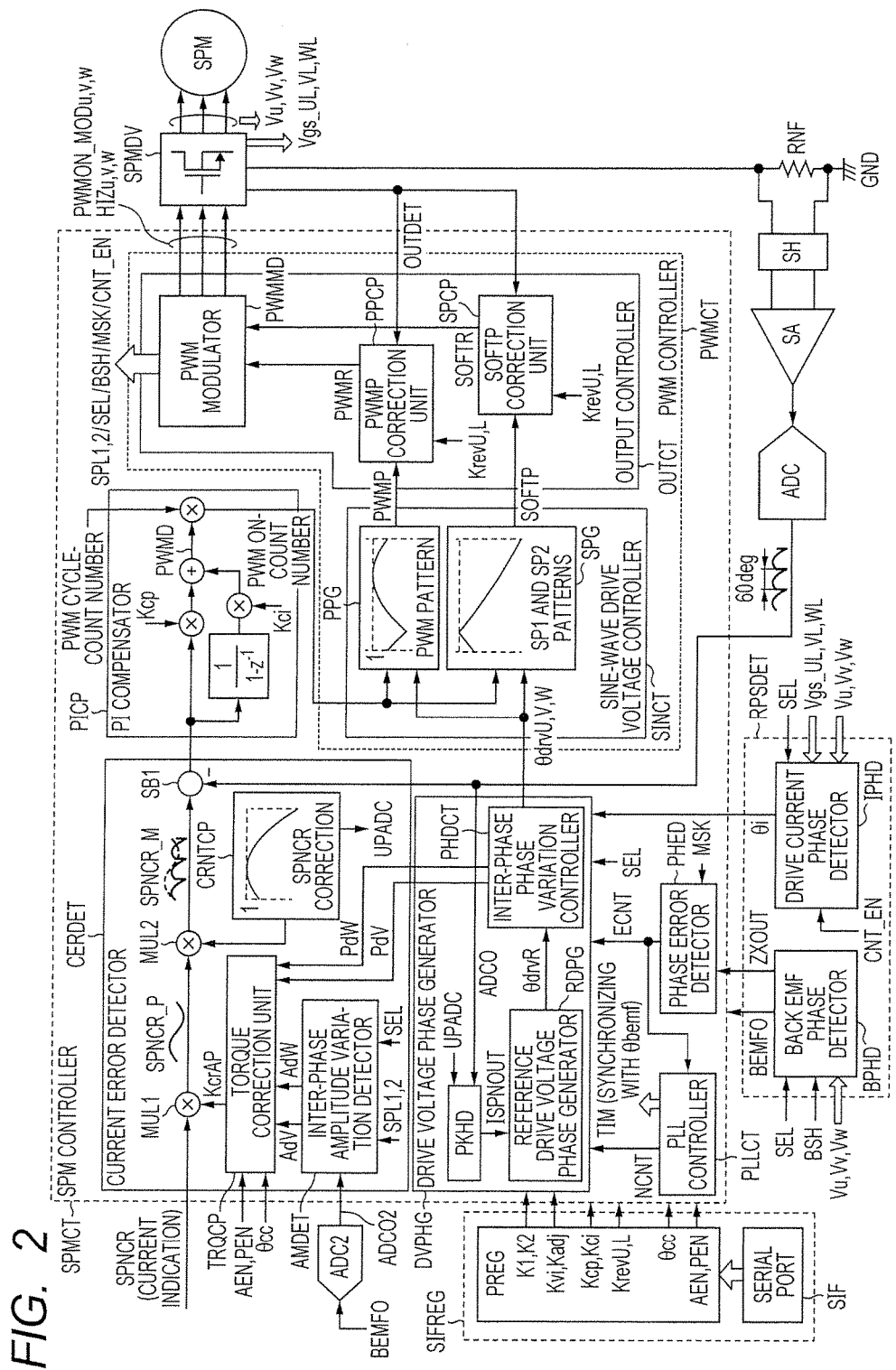
FIG. 2 is a functional block diagram illustrating an example of the configuration of the principal part of the motor driving device according to Embodiment 1 of the present invention.

FIG. 2 is a functional block diagram illustrating an example of a configuration of the principal part of the motor driving device according to Embodiment 1 of the present invention. The motor driving device MDIC illustrated in FIG. 2 is different from the example of the configuration illustrated in FIG. 18 in the configuration and the operation of the phase error detector PHED, the drive voltage phase generator DVPHG, and the current error detector CERDET. In addition to the example of the configuration of FIG. 18, the motor driving device MDIC concerned includes an analog-to-digital converter ADC2.

As is the case with FIG. 18, the phase error detector PHED detects the error between the BEMF phase of each phase and the reference BEMF phase θbemf, and outputs a phase error signal ECNT. In this case, the phase error detector PHED outputs to the drive voltage phase generator DVPHG, the phase error signal ECNT that is obtained based on the error between the BEMF phase (θbemf_V, θbemf_W) of the phases (the v phase and the w phase) except the reference phase and the reference BEMF phase θbemf (namely, the BEMF phase of the u phase (θbemf_U)).

The drive voltage phase generator DVPHG includes an inter-phase phase variation controller PHDCT, in addition to the peak holding unit PKHD and the reference drive voltage phase generator RDPG as is the case with FIG. 18. The inter-phase phase variation controller PHDCT determines the drive voltage phases θdrvU, θdrvV, and θdrvW for every phase at the time of applying the drive voltages Vu, Vv, and Vw to the drive output terminals (the motor drive terminal) OUTu, OUTv, and OUTw, so that the drive current phase and the BEMF phase may match for each phase of the motor SPM.

Specifically, the inter-phase phase variation controller PHDCT determines the drive voltage phases θdrvU, θdrvV, and θdrvW, by using the reference drive voltage phase θdrvR and the phase error signals ECNT of the v phase and the w phase. Here, the reference drive voltage phase θdrvR is supplied from the reference drive voltage phase generator RDPG as the reference for matching the BEMF phase and the drive current phase of the u phase. The phase error signals ECNT of the v phase and the w phase is supplied from the phase error detector PHED. The PWM controller PWMCT receives the drive voltage phases θdrvU, θdrvV, and θdrvW, shifts the energization timing signal TIM synchronizing with the reference BEMF phase θbemf based on the drive voltage phases θdrvU, θdrvV, and θdrvW, respectively, and generates the PWM signals PWMON_MODu, PWMON_MODv, and PWMON_MODw based on the energization timing signal after the shift concerned.

The inter-phase phase variation controller PHDCT detects the phase variations of the BEMF (the magnitude of the electrical angle) among the three phases, based on the phase error signals ECNT of the v phase and the w phase supplied from the phase error detector PHED, and outputs phase variation signals PdV and PdW as the detection result. The phase variation signal PdV expresses the phase variations between the reference phase (the u phase) and the v phase, and the phase variation signal PdW expresses the phase variations between the reference phase (the u phase) and the w phase.

The current error detector CERDET includes an inter-phase amplitude variation detector AMDET, a torque correction unit TRQCP, and a multiplier MUL1, in addition to the indicating current correction unit CRNTCP, the multiplier MUL2, and the subtraction unit SB1 as is the case with FIG. 18. The inter-phase amplitude variation detector AMDET detects the amplitude variations among the three phases, by calculating the ratio of the amplitude of the back electromotive force (BEMF amplitude) of the reference phase (the u phase) to the BEMF amplitude of the other two phases.

Specifically, the back EMF phase detector BPHD described above functions also as the back EMF amplitude detector to detect the BEMF amplitude BEMFO of each phase in the motor SPM. The analog-to-digital converter ADC2 converts the BEMF amplitude BEMFO of each phase concerned into a digital value ADCO2. The inter-phase amplitude variation detector AMDET detects the amplitude variations (amplitude ratios to the reference phase) among the three phases using the digital value ADCO2 concerned, and outputs amplitude variation signals AdV and AdW as the detection result. The amplitude variation signal AdV expresses the amplitude variations between the reference phase (the u phase) and the v phase, and the amplitude variation signal AdW expresses the amplitude variations between the reference phase (the u phase) and the w phase.

The torque correction unit TRQCP calculates the phase-specific torque correction coefficient of a periodic function, based on the phase variation signals PdV and PdW (namely, the phase variations of the BEMF among the three phases) supplied from the inter-phase phase variation controller PHDCT. The torque correction unit TRQCP calculates the amplitude-specific torque correction coefficient of a periodic function, based on the amplitude variation signals AdV and AdW (namely, the amplitude variations of the BEMF among the three phases) supplied from the inter-phase amplitude variation detector AMDET.

Defining the addition result of the phase-specific torque correction coefficient concerned and the amplitude-specific torque correction coefficient as a torque correction coefficient KcrAP, the torque correction unit TRQCP superimposes the torque correction coefficient KcrAP on the current indication value SPNCR with the aid of the multiplier MUL1 to correct the current indication value SPNCR. Then, the torque correction unit TRQCP outputs the current indication value SPNCR_P as the correction result. The multiplier MUL2 multiplies the current indication value SPNCR_P concerned by the digital pattern supplied from the indicating current correction unit CRNTCP, and outputs a final current indication value SPNCR_M.

The motor driving device MDIC drives the motor SPM by performing the feedback control using a current control loop with the current indication value SPNCR_M concerned as a target value. As is the case with FIG. 18, the current control loop includes the subtraction unit SB1, the PI compensator PICP, the PWM controller PWMCT, the SPM driver SPMDV, the current detection resistor RNF, the sample hold circuit SH, the sense amplifier circuit SA, and the analog-to-digital converter ADC. According to such a configuration, as described in FIG. 18, the current control loop detects the drive current of the motor SPM, detects an error between the detected current value (ADCO) concerned and the current indication value SPNCR_M as the target value of the drive current, and determines the duty of the PWM signal PWMON_MOD (u, v, w) reflecting the error concerned.

《The Operation of the Torque Correction Unit》

FIG. 3 is a waveform chart illustrating an example of back electromotive force, a drive current, a current indication value, and a torque ripple of the motor, at the time of driving the motor by the motor driving device illustrated in FIG. 2. In FIG. 3, as is the case with FIG. 22, as for the BEMF phase of the three phases, the BEMF phase of the v phase leads by one degree and the w phase lags by one degree relative to the u phase as the reference phase. On the other hand, differing from the case with FIG. 22, the drive current phase of the three phases is controlled by the inter-phase phase variation controller PHDCT so that the drive current phase and the BEMF phase match for every phase of the motor SPM. For example, as shown in FIG. 3, when the BEMF phase of the v phase leads by one degree relative to the BEMF phase of the reference phase (the u phase), the inter-phase phase variation controller PHDCT controls the drive voltage phase θdrvV to make the drive current phase of the v phase lead by one degree relative to the drive current phase as the reference phase (the u phase).

Furthermore, differing from the case with FIG. 22, the current indication value SPNCR_P in FIG. 3 is a periodic function following the torque correction coefficient (here the phase-specific torque correction coefficient) KcrAP supplied from the torque correction unit TRQCP. Specifically, the torque correction coefficient (the phase-specific torque correction coefficient) KcrAP has frequency twice the frequency of the BEMF, and is a periodic function (for example, a sine function) of which the amplitude and the phase change according to the phase variations among the three phases of the BEMF.

When explained in detail, the torque Tp of the motor is given by an addition result of the three-phase torques obtained by a function of "BEMF×drive current", respectively. In detail, the torque Tp of the motor is expressed by Equation (1) in terms of the reference BEMF phase θbemf (namely, the BEMF phase of the u phase), the values of the phase variation signals PdV and PdW of the v phase and the w phase with reference to the u phase, the torque constant "Kt" of the motor SPM, and the drive current "Ispn" of each phase of the motor. In Equation (1), the value of "GrP" is given by Equation (2) and the value of "DrP" is given by Equation (3).

[Equation 1]

$$T_p = K_t \cdot I_{spn}\sin^2\theta_{bemf} + K_t \cdot I_{spn}\sin^2\left(\theta_{bemf} - \frac{2}{3}\pi + PdV\right) + \quad (1)$$
$$K_t \cdot I_{spn}\sin^2\left(\theta_{bemf} + \frac{2}{3}\pi + PdW\right)$$
$$= \frac{3K_t \cdot I_{spn}}{2}\left[1 - \frac{1}{3}\left\{\cos 2\theta_{bemf} + \cos 2\left(\theta_{bemf} - \frac{2}{3}\pi + PdV\right) + \cos 2\left(\theta_{bemf} + \frac{2}{3}\pi + PdW\right)\right\}\right]$$
$$\approx \frac{3K_t \cdot I_{spn}}{2}\left[1 - \frac{1}{3}GrP\sin 2\left(\theta_{bemf} + \frac{DrP}{2}\right)\right]$$

[Equation 2]

$$GrP = 2\sqrt{(PdV - PdW)^2 + PdV \cdot PdW} \quad (2)$$

[Equation 3]

$$DrP = \pi - \tan^{-1}\frac{\sqrt{3} \cdot (PdV - PdW)}{(PdV + PdW)} \quad (3)$$

As understood from Equation (1), Equation (2), and Equation (3), when the phase variations (PdV, PdW) are null, the torque Tp takes a steady value, and the torque ripple does not arise. On the other hand, when the phase variations (PdV, PdW) are not null, the torque ripple acting as the second-order component (sin 2θbemf) of the reference BEMF phase θbemf arises, as illustrated also in FIG. 22. The torque ripple concerned has the amplitude (GrP) and the phase (DrP) changing according to the magnitude of the phase variations (PdV, PdW).

Therefore, in order to remove the torque ripple concerned, the motor current "Ispn" is corrected as expressed by Equation (4). That is, the correction is performed to superimpose the phase-specific torque correction coefficient DcrP0 of the second-order periodic function expressed by Equation (5) on "Ispn0" corresponding to the current indication value SPNCR illustrated in FIG. 2.

[Equation 4]

$$I_{spn} = I_{spn0}\left\{1 + GdP \cdot \sin 2\left(\theta_{bemf} + \frac{DdP}{2}\right)\right\} \quad (4)$$

[Equation 5]

$$DcrP0 = 1 + GdP \cdot \sin 2\left(\theta_{bemf} + \frac{DdP}{2}\right) \quad (5)$$

When the motor current "Ispn" expressed by Equation (4) is substituted in Equation (1), the torque Tp expressed by Equation (6) is obtained. In Equation (6), the torque ripple can be removed by setting as "GdP=(⅓)×GrP" and "DdP=DrP." Therefore, "GdP" in the phase-specific torque correction coefficient DcrP0 of Equation (5) is given by Equation (7), and "DdP" is given by Equation (8). As a result, the phase-specific torque correction coefficient DcrP0 becomes a periodic function (here a sine function) with the amplitude (GdP) and the phase (DdP) changing according to the phase variations (PdV, PdW).

[Equation 6]

$$T_p \approx \quad (6)$$
$$\frac{3K_t \cdot I_{spn0}}{2}\left[1 + GdP \cdot \sin 2\left(\theta_{bemf} + \frac{DdP}{2}\right) - \frac{1}{3}GrP\sin 2\left(\theta_{bemf} + \frac{DrP}{2}\right)\right]$$

[Equation 7]

$$GdP = \frac{2\sqrt{(PdV - PdW)^2 + PdV \cdot PdW}}{3} \quad (7)$$

[Equation 8]

$$DdP = \pi - \tan^{-1}\frac{\sqrt{3} \cdot (PdV - PdW)}{(PdV + PdW)} \quad (8)$$

In this way, by using the current indication value SPNCRP reflecting the phase-specific torque correction coefficient DcrP0, it is possible to reduce the torque ripple of the motor SPM, as illustrated in FIG. 3. Even if the motor SPM has magnetization variations, it becomes possible to suppress noises and vibrations in the motor drive.

It should be noted that Equation (1) assumes that the BEMF phase and the drive current phase are matched in all the three phases. The inter-phase phase variation controller PHDCT performs operation for satisfying this assumption. However, depending on circumstances, it is also possible to develop a formula of the torque Tp on the assumption that the BEMF phase and the drive current phase are not matched in the v phase and the w phase for example and to derive a formula of the phase-specific torque correction coefficient DcrP0. In this case, the operation by the inter-phase phase variation controller PHDCT concerned becomes unnecessary. However, it is likely that the formula of the torque Tp and the formula of the phase-specific torque correction coefficient DcrP0 may be complicated. It becomes useful from this viewpoint to use the inter-phase phase variation controller PHDCT.

The present description adopts the system in which one of the three phases is set as a reference phase and the reference BEMF phase θbemf is determined for the phase. However, depending on circumstances, it is also possible to adopt a system in which the reference BEMF phase θbemf is determined by the mean value of the BEMF phase of the three-phases, for example. However, in this case, it is necessary to add a parameter to express the phase variations (PdU) of the u phase in Equation (1). Accordingly, it is also likely that Equation (1) may become complicated to some extent. It becomes useful from this viewpoint to set one of the three phases (here the u phase) as the reference phase.

FIG. 4 is a waveform chart illustrating another example, different from FIG. 3, of the back electromotive force, the drive current, the current indication value, and the torque ripple of the motor. In FIG. 4, as is the case with FIG. 26, the BEMF amplitude of the v phase is reduced by 2% and the BEMF amplitude of the w phase increased by 2%, with reference to the BEMF amplitude of the u phase. Differing from the case of FIG. 26, the current indication value SPNCR_P in FIG. 4 is a periodic function following the torque correction coefficient (here the amplitude-specific torque correction coefficient) KcrAP supplied from the torque correction unit TRQCP. The torque correction coefficient (the amplitude-specific torque correction coefficient) KcrAP has frequency twice the frequency of the BEMF, and is a periodic function (for example, a sine function) of which the amplitude and the phase change according to the amplitude variations among the three phases of the BEMF.

When explained in detail, the torque Ta of the motor is expressed by Equation (9) in terms of the reference BEMF phase θbemf (namely, the BEMF phase of the u phase), the value of the amplitude variation signals AdV and AdW of the v phase and the w phase with reference to the u phase, the torque constant "Kt" of the motor SPM, and the drive current "Ispn" of each phase of the motor. In Equation (9), the value of "GrA" is given by Equation (10) and the value of "DrA" is given by Equation (11).

[Equation 9]

$$T_a = K_t \cdot I_{spn} \sin^2 \theta_{bemf} + (1 + AdV) \cdot K_t \cdot I_{spn} \sin^2\left(\theta_{bemf} - \frac{2}{3}\pi\right) +$$
$$(1 + AdW) \cdot K_t \cdot I_{spn} \sin^2\left(\theta_{bemf} + \frac{2}{3}\pi\right)$$
$$= \frac{3K_t \cdot I_{spn}}{2}\left[1 - \frac{1}{3}\left\{-(AdV + AdW) + AdV \cdot \cos 2\left(\theta_{bemf} - \frac{2}{3}\pi\right) + AdW \cdot \cos 2\left(\theta_{bemf} + \frac{2}{3}\pi\right)\right\}\right]$$
$$\approx \frac{3K_t \cdot I_{spn}}{2}\left[1 - \frac{1}{3} GrA \sin 2\left(\theta_{bemf} + \frac{DrA}{2}\right)\right] \quad (9)$$

[Equation 10]

$$GrA = \sqrt{(AdV - AdW)^2 + AdV \cdot AdW} \quad (10)$$

[Equation 11]

$$DrA = \frac{\pi}{2} - \tan^{-1}\frac{\sqrt{3} \cdot (AdV - AdW)}{(AdV + AdW)} \quad (11)$$

As understood from Equation (9), Equation (10), and Equation (11), when the amplitude variations (AdV, AdW) are null, the torque Ta takes a steady value, and the torque ripple does not arise. On the other hand, when the amplitude variations (AdV, AdW) are not null, the torque ripple acting as the second-order component (sin 2θbemf) of the reference BEMF phase θbemf arises, as illustrated also in FIG. 26. The torque ripple concerned has the amplitude (GrA) and the phase (DrA) changing according to the magnitude of the amplitude variations (AdV, AdW).

Therefore, in order to remove the torque ripple concerned, the motor current "Ispn" is corrected as expressed by Equation (12). That is, the correction is performed to superimpose the amplitude-specific torque correction coefficient DcrA0 of the second-order periodic function expressed by Equation (13) on "Ispn0" corresponding to the current indication value SPNCR illustrated in FIG. 2.

[Equation 12]

$$I_{spn} = I_{spn0}\left\{1 + GdA \cdot \sin 2\left(\theta_{bemf} + \frac{DdA}{2}\right)\right\} \quad (12)$$

[Equation 13]

$$DcrA0 = 1 + GdA \cdot \sin 2\left(\theta_{bemf} + \frac{DdA}{2}\right) \quad (13)$$

When the motor current "Ispn" expressed by Equation (12) is substituted in Equation (9), the torque Ta expressed by Equation (14) is obtained. In Equation (14), the torque ripple can be removed by setting as "GdA=(⅓)×GrA" and "DdA=DrA." Therefore, "GdA" in the amplitude-specific torque correction coefficient DcrA0 of Equation (13) is given by Equation (15), and "DdA" is given by Equation (16). Consequently, the amplitude-specific torque correction coefficient DcrA0 becomes a periodic function (here a sine function) with the amplitude (GdA) and the phase (DdA) changing according to the amplitude variations (AdV, AdW).

[Equation 14]

$$T_a \approx \frac{3K_t \cdot I_{spn0}}{2}\left[1 + GdA \cdot \sin 2\left(\theta_{bemf} + \frac{DdA}{2}\right) - \frac{1}{3} GrA \sin 2\left(\theta_{bemf} + \frac{DrA}{2}\right)\right] \quad (14)$$

[Equation 15]

$$GdA = \frac{\sqrt{(AdV - AdW)^2 + AdV \cdot AdW}}{3} \quad (15)$$

[Equation 16]

$$DdA = \frac{\pi}{2} - \tan^{-1}\frac{\sqrt{3} \cdot (AdV - AdW)}{(AdV + AdW)} \quad (16)$$

As the result of having performed such a correction, as the actual operation, the drive current amplitude of each phase is corrected to the reciprocal ratio of the amplitude variations (ratio) of the BEMF of the own phase. For example, when the BEMF amplitude of the v phase is −2% with reference to the reference phase (the u phase) as shown in FIG. 4, the drive current amplitude of the v phase is corrected to +2% with reference to the reference phase (the u phase). That is, the torque of each phase becomes the function of "BEMF×drive current." Accordingly, for example, when the BEMF amplitude of a certain phase varies K times, by correcting the drive current amplitude of the phase concerned to "1/K" times, the torque of each phase can be kept constant.

In this way, by using the current indication value SPN-CR_P reflecting the amplitude-specific torque correction coefficient DcrA0, it is possible to reduce the torque ripple of the motor SPM. Even if the motor SPM has magnetization variations, it becomes possible to suppress noises and vibrations in the motor drive. In this case, as is the case with FIG. 3, the inter-phase phase variation controller PHDCT is used and one of the three phases is set as a reference phase. Consequently, it is possible to simplify various formulas.

It is desirable to perform both of the correction using the phase-specific torque correction coefficient DcrP0 illustrated in FIG. 3, and the correction using the amplitude-specific torque correction coefficient DcrA0 illustrated in FIG. 4. However, even if one of the corrections is performed depending on circumstances, it is possible to acquire the reduction effect of the torque ripple to some extent.

«The Outline of the Drive Voltage Phase Generator»

Figure 5:
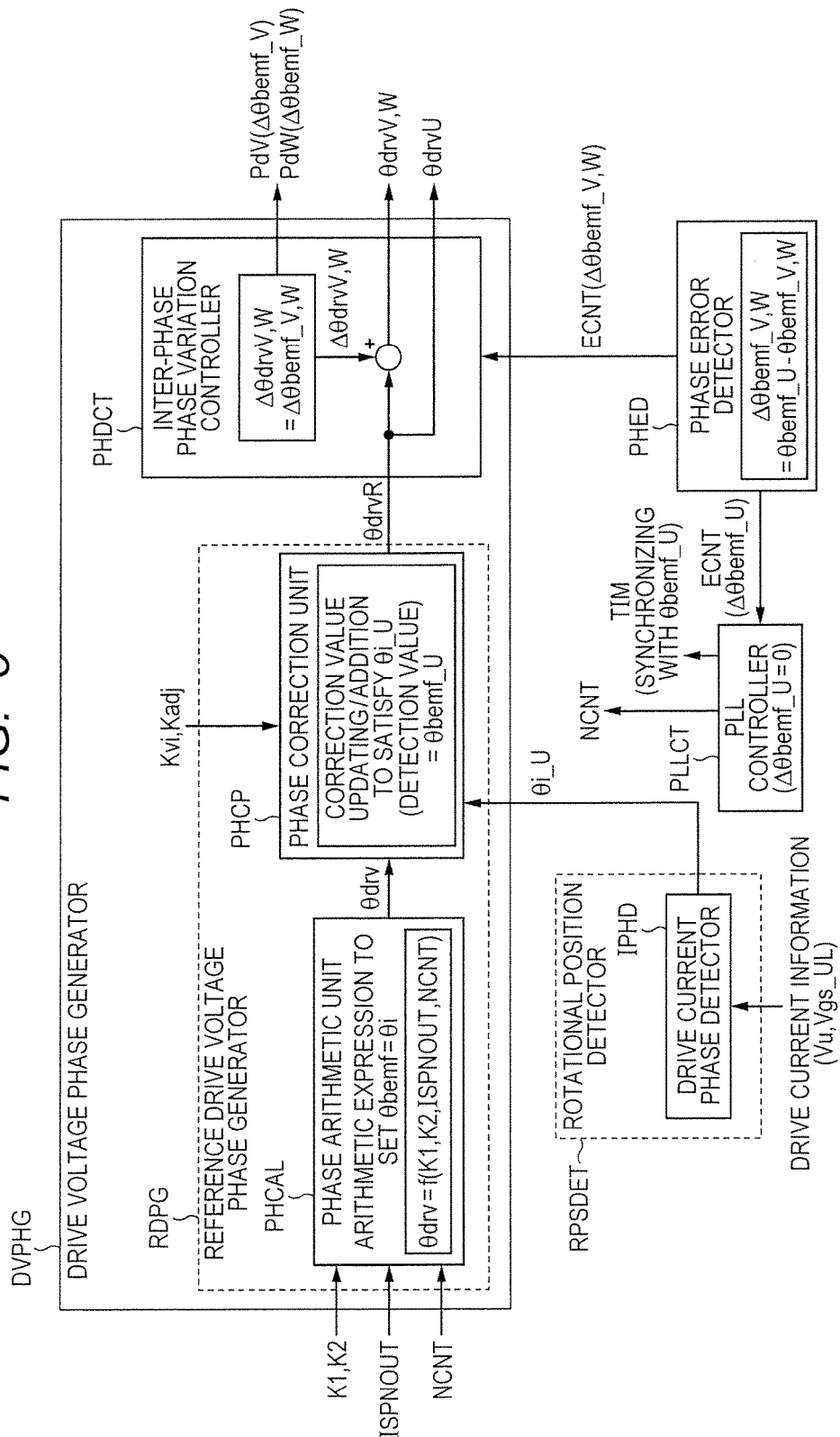
FIG. 5 is a block diagram illustrating an example of the outline configuration of the principal part around a drive voltage phase generator in the motor driving device illustrated in FIG. 2.

FIG. 5 is a block diagram illustrating an example of the outline configuration of the principal part around the drive voltage phase generator in the motor driving device illustrated in FIG. 2. FIG. 5 illustrates the drive voltage phase generator DVPHG, the phase error detector PHED, the drive current phase detector IPHD, and the PLL controller PLLCT that are illustrated in FIG. 2. The drive voltage phase generator DVPHG includes a reference drive voltage phase generator RDPG and an inter-phase phase variation controller PHDCT.

The reference drive voltage phase generator RDPG includes a phase arithmetic unit PHCAL and a phase correction unit PHCP, and determines the drive voltage phase θdrvR of the reference at the time of applying the drive voltage so that the phase difference between the drive current phase θi inputted and the reference BEMF phase θbemf reduces to zero. The phase arithmetic unit PHCAL calculates the drive voltage phase θdrv used for reducing the phase difference between the reference BEMF phase θbemf and the drive current phase θi to zero, based on an arithmetic expression using the current value of the drive current of each phase of the motor SPM, the angular frequency ω of the motor SPM, and the characteristic constants K1 and K2 of the motor SPM determined by a parameter setting register PREG illustrated in FIG. 2. The current value of the drive current is obtained from the drive current amplitude ISPNOUT supplied from the peak holding unit PKHD illustrated in FIG. 2, and the angular frequency ω of the motor SPM is obtained from the rotational cycle count value NCNT supplied from the PLL controller PLLCT.

Here, the drive voltage phase θdrv calculated by the phase arithmetic unit PHCAL changes according to the characteristic constants K1 and K2 of the motor SPM. The characteristic constants K1 and K2 are determined for every kind of the motor, for example. However, even if a motor SPM is of the same kind for example, there is a possibility that variations in the characteristic constants K1 and K2 may arise for every motor, due to the manufacturing variations. Even in one motor SPM as the target, there is a possibility that variations in the characteristic constants K1 and K2 may arise in chronological order due to time degradation. Accordingly, there is a possibility that the phase difference between the reference BEMF phase θbemf and the drive current phase θi may deviate from zero.

Therefore, the phase correction unit PHCP adds a correction value to the drive voltage phase θdrv supplied from the phase arithmetic unit PHCAL to determine the reference drive voltage phase θdrvR. In this case, the phase correction unit PHCP updates the magnitude of the correction value by a feedback control so that the phase difference between the reference BEMF phase θbemf (the BEMF phase θbemf_U of the reference phase (the u phase)) and the drive current phase θi_U of the reference phase (the u phase) may converge to zero. Namely, as the feedback path, the drive current flows through the motor SPM in the state where the reference drive voltage phase θdrvR is reflected, the drive current phase θi_U of the u phase is detected by the drive current phase detector IPHD, the correction value is updated based on this detection result, and the reference drive voltage phase θdrvR is also updated.

Accordingly, even when the motor SPM shows the variations in the characteristic constants K1 and K2, it is possible to set to zero the phase difference between the BEMF phase θbemf_U in the reference phase (the u phase) and the drive current phase θi_U, with a high degree of accuracy. However, when the magnetization variations arise in the motor SPM with reference to the u phase, it is likely that a torque ripple may arise as illustrated in FIG. 22. The inter-phase phase variation controller PHDCT performs control to match the drive current phase and the BEMF phase for each phase of the motor SPM, as a premise that the torque correction is performed for removing the torque ripple concerned, as described in FIG. 3.

Specifically, the reference drive voltage phase θdrvR supplied from the reference drive voltage phase generator RDPG and the phase error signals ECNT of the v phase and the w phase supplied from the phase error detector PHED are inputted to the inter-phase phase variation controller PHDCT. The phase error signal ECNT of the v phase expresses the phase error (an electrical angle Δθbemf_V) between the reference phase (the u phase) and the v phase in terms of the count value in the digital control, and the phase error signal ECNT of the w phase expresses the phase error (an electrical angle Δθbemf_W) between the reference phase (the u phase) and the w phase in terms of the count value in the digital control.

The inter-phase phase variation controller PHDCT converts the phase error signals ECNT of the v phase and the w phase into the electrical angles Δθbemf_V and Δθbemf_W, and outputs them as the phase variation signals PdV and PdW. The inter-phase phase variation controller PHDCT determines the reference drive voltage phase θdrvR as the drive voltage phase θdrvU of the u phase, and determines the drive voltage phases of the v phase and the w phase, θdrvV and θdrvW, by adding the electrical angles Δθbemf_V and Δθbemf_W to the reference drive voltage phase θdrvR, respectively.

As described above, the PLL controller PLLCT generates the energization timing signal TIM synchronizing with the BEMF phase of the reference phase by performing the PLL control to converge the phase error signal ECNT of the reference phase (the u phase) to zero. The phase error detector PHED detects the phase errors of the BEMF phases of the v phase and the w phase with reference to the BEMF phase of the u phase, based on the above-described energization timing signal TIM, respectively.

《The Configuration and the Operation of the Rotational Position Detector and the Phase Error Detector》

Figure 6:
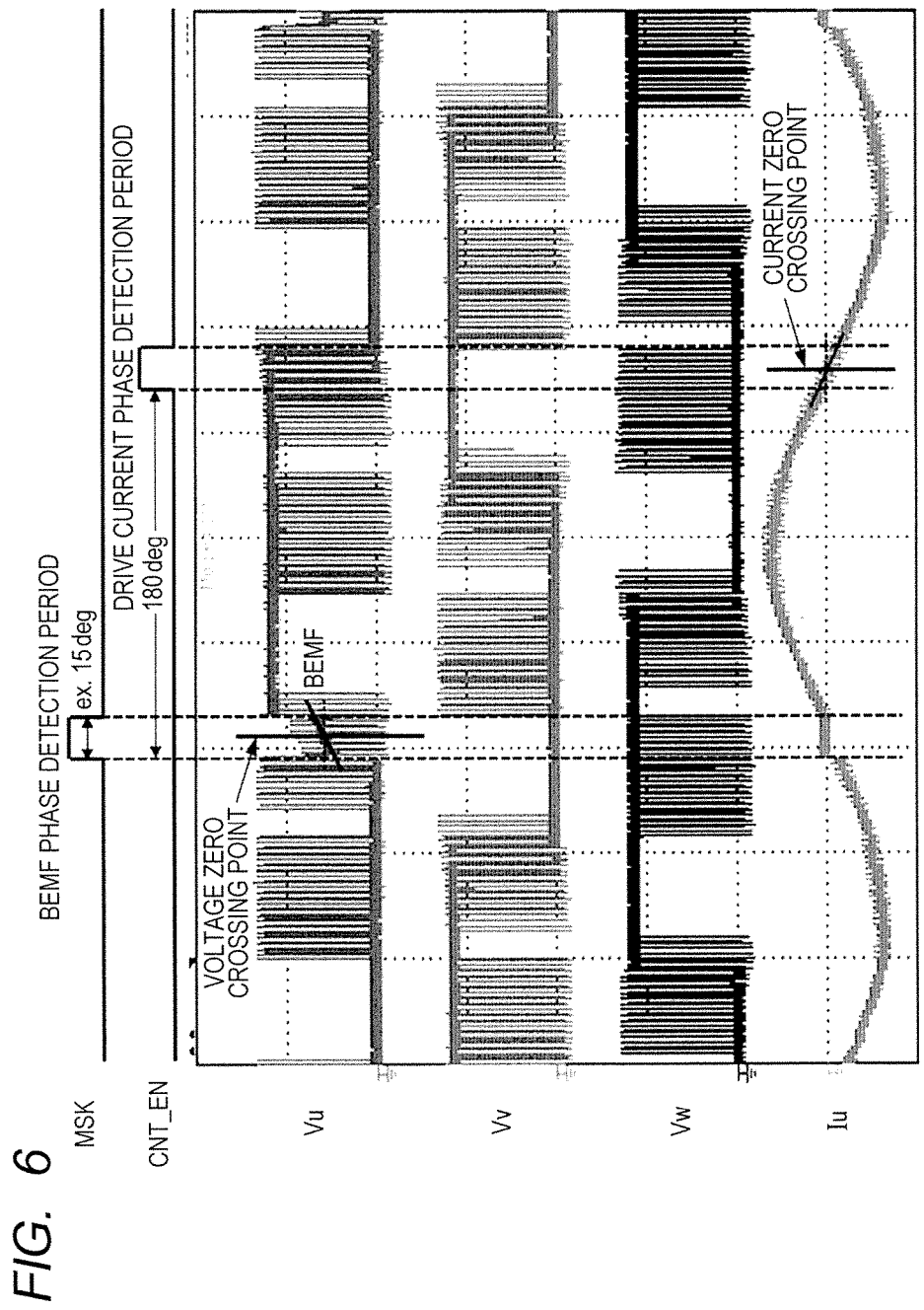
FIG. 6 is a waveform chart illustrating an example of the detection period in a rotational position detector and a phase error detector illustrated in FIG. 2.

FIG. 6 is a waveform chart illustrating an example of the detection period in the rotational position detector and the phase error detector illustrated in FIG. 2. FIG. 6 illustrates the drive voltages Vu, Vv, and Vw of each phase applied to the motor SPM and the drive current Iu of the u phase. As illustrated in FIG. 6, the drive voltages Vu, Vv, and Vw are PWM signals when observed at each time, and become the voltage waveforms as illustrated in FIG. 21 when observed in the time average.

The inverter INVBK illustrated in FIG. 19 applies the drive voltages Vu, Vv, and Vw to the motor according to a 180-degree energization system without a non-energization period based on the drive system illustrated in FIG. 21. In this case, in order to detect the BEMF phase of the u phase, for example, it is necessary to provide a non-energization period in a predetermined period including the voltage zero crossing point (at the point in time of passing the half value of the voltage amplitude) of the BEMF. Therefore, the PWM modulator PWMMD asserts the high impedance control signal HIZu to provide a non-energization period (for example, about 15 degrees) within the energization period of 360 degrees, and asserts the mask signal MSK in this non-energization period as illustrated in FIG. 6. The phase error detector PHED fetches the zero crossing detection signal ZXOUT supplied from the back EMF phase detector BPHD in the assertion period of the mask signal MSK concerned, and detects the phase error of the BEMF phase of the u phase.

Although not restricted in particular, the PWM modulator PWMMD asserts the drive current detection enable signal CNT_EN, in the energization period that is different in phase by 180 degrees from the non-energization period concerned, as illustrated in FIG. 6. The assertion period of the drive current detection enable signal CNT_EN concerned is the same length (for example, about 15 degrees) as the non-energization period described above, for example. The drive current phase detector IPHD detects the drive current phase of the u phase θi_U by detecting the current zero crossing point of the drive current Iu in the assertion period of the drive current detection enable signal CNT_EN concerned.

Here, as described above, the PWM modulator PWMMD controls the energization to the motor SPM, based on the energization timing signal TIM synchronizing with the reference BEMF phase θbemf supplied from the PLL controller PLLCT. The PWM modulator PWMMD can narrow down the period in which the voltage zero crossing point of the BEMF of each phase may exist in the near future, to a sufficiently narrow range (for example, 60 or less degrees, desirably less than about 15 degrees), based on the energization timing signal TIM described above. The PWM modulator PWMMD generates the mask signal MSK in this narrowed-down period. This non-energization period becomes a factor to distort the sine wave of the drive current. Accordingly, it is desirable that this non-energization period is as short as possible. However, when the non-energization period is too short, there may be the situation where the voltage zero crossing point does not exist within the period concerned, due to a variation of the angular velocity ω of the motor SPM. Accordingly, the non-energization period is determined in view of the trade-offs between them.

«Details of the Back EMF Phase Detector and the Phase Error Detector»

Figure 7:
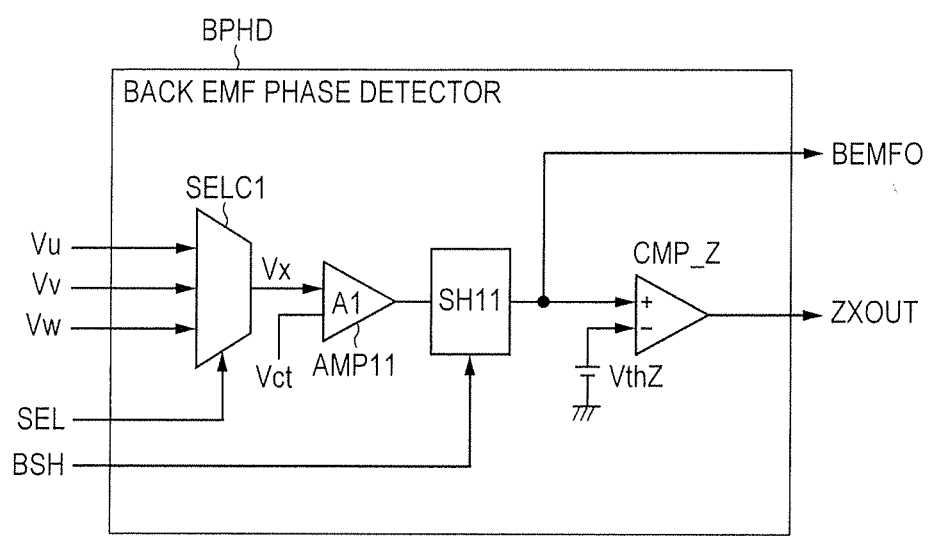
FIG. 7 is a circuit diagram illustrating an example of the detailed configuration of a back EMF phase detector illustrated in FIG. 2.

FIG. 7 is a circuit diagram illustrating an example of the detailed configuration of the back EMF phase detector illustrated in FIG. 2. The back EMF phase detector BPHD illustrated in FIG. 7 includes a selection circuit SELC1, an amplifier circuit AMP11, a sample hold circuit SH11, and a comparator circuit CMP_Z. The selection circuit SELC1 selects one of the three-phase drive voltages Vu, Vv, or Vw based on the phase selection signal SEL, and outputs the drive voltage Vx of the selected phase. The amplifier circuit AMP11 amplifies the drive voltage Vx of the selected phase with reference to the voltage Vct of the neutral point CT.

Responding to the sampling signal BSH, the sample hold circuit SH11 samples and holds the output voltage of the amplifier circuit AMP11. The comparator circuit CMP_Z makes a transition in the logical level of the zero crossing detection signal ZXOUT, when the BEMF amplitude BEMFO as the output voltage of the sample hold circuit SH11 reaches a zero cross voltage VthZ (corresponding to the output voltage of the amplifier circuit AMP11 when Vx=Vct). The sampling signal BSH and the phase selection signal SEL are generated by the PWM modulator PWMMD. The sampling signal BSH is generated for each PWM cycle, in the period when a high-side transistor of one phase of the two phases except the selected phase and a low-side transistor of the other phase of the two phases are both ON in each PWM cycle.

Figure 8:
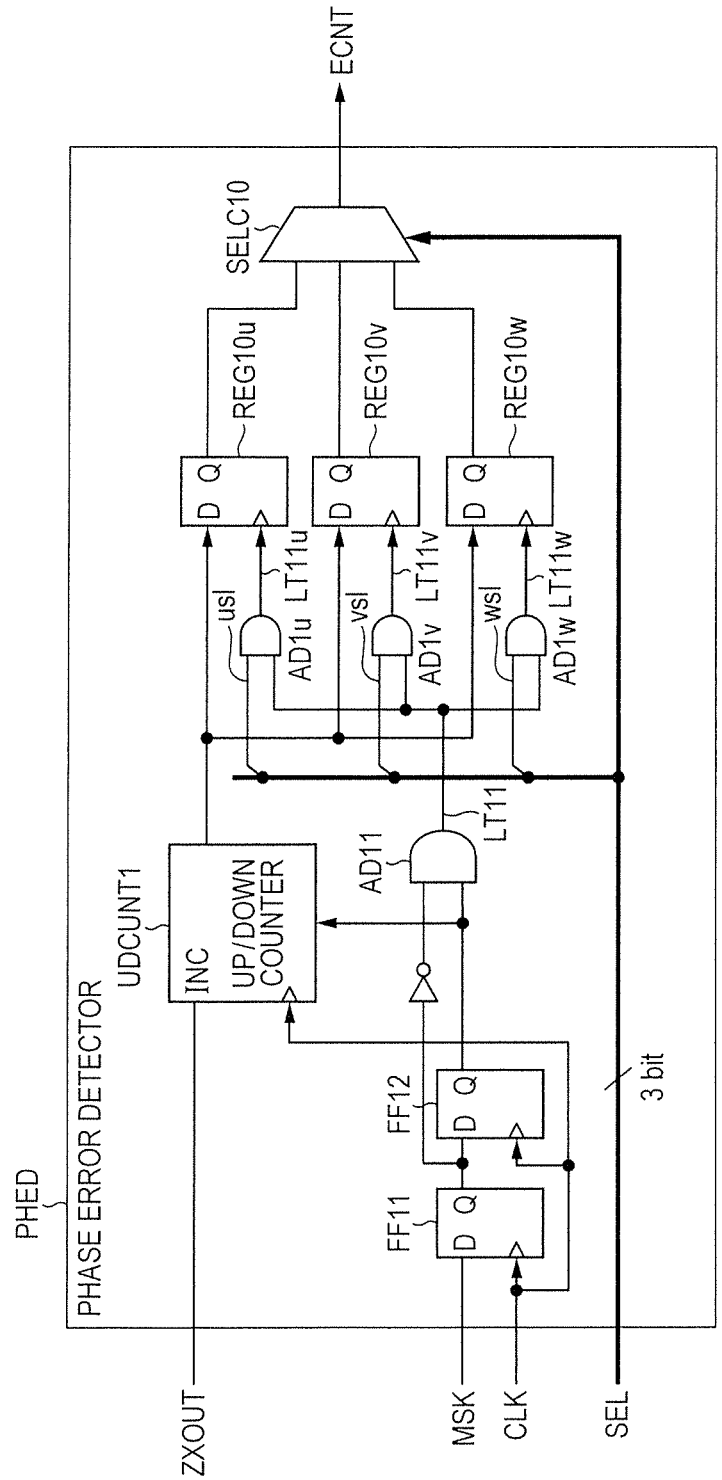
FIG. 8 is a circuit diagram illustrating an example of the detailed configuration of a phase error detector illustrated in FIG. 2.

FIG. 8 is a circuit diagram illustrating an example of the detailed configuration of the phase error detector illustrated in FIG. 2. The phase error detector PHED illustrated in FIG. 8 includes Flip-flop circuits FF11 and FF12, an up/down counter circuit UDCUNT1, AND circuits AD11, AD1u, AD1v and AD1w, register circuits REG10u, REG10v and REG10w, and a selection circuit SELC10.

The flip-flop circuits FF11 and FF12 latch the mask signal MSK sequentially in synchronization with the reference clock CLK of the digital control, and output it to the up/down counter circuit UDCUNT1. The up/down counter circuit UDCUNT1 becomes in an enabled state in the assertion period of the mask signal MSK, and performs the count operation based on the zero crossing detection signal ZXOUT in this enabled state. Specifically, the up/down counter circuit UDCUNT1 performs count-up at the reference clock CLK when the zero crossing detection signal ZXOUT is at one logical level, and performs count-down at the reference clock CLK when the zero crossing detection signal ZXOUT is at the other logical level.

The AND circuit AD11 performs an AND operation by inputting the inverted output of the flip-flop circuit FF11 and the output of the flip-flop circuit FF12. Consequently, the AND circuit AD1 outputs a latch signal LT11 serving as a one-shot pulse signal when the mask signal MSK makes a transition from an assertion period to a negation period. The AND circuits AD1u, AD1v, and AD1w respectively perform an AND operation of two inputs of the latch signal LT11 and signals usl, vsl, and wsl, each of which configures the phase selection signal SEL, and outputs the latch signals LT11u, LT11v, and LT11w to the corresponding register circuits REG10u, REG10v, and REG10w.

The register circuits REG10u, REG10v, and REG10w latch the count value of the up/down counter circuit UDCUNT1, upon being triggered by the latch signals LT11u, LT11v, and LT11w, respectively. The selection circuit SELC10 outputs the count value of one of the register circuits REG10u, REG10v, and REG10w as the phase error signal ECNT based on the phase selection signal SEL.

Figure 9:
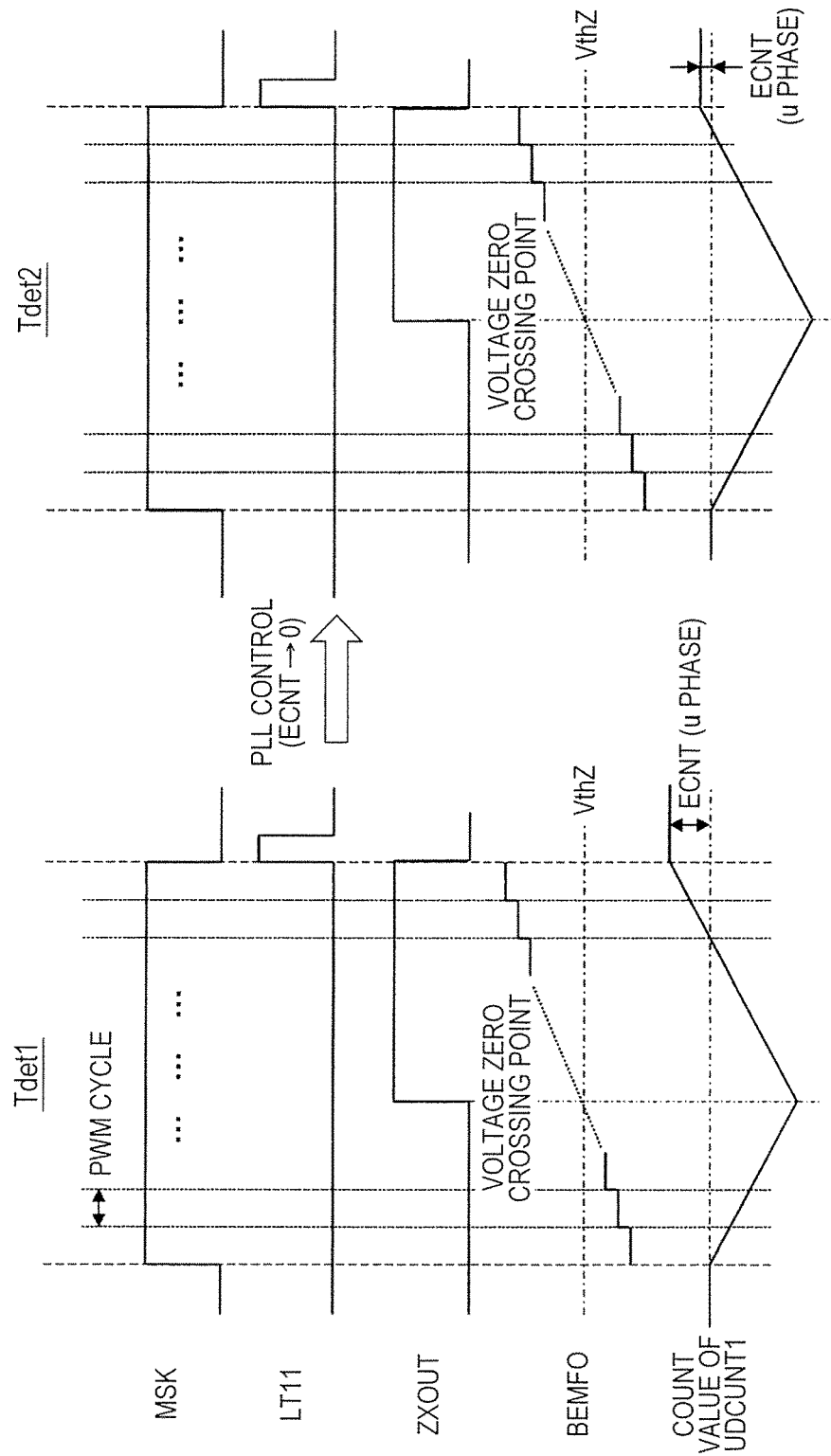
FIG. 9 is an explanatory drawing illustrating an example of the rough operations in the back EMF phase detector illustrated in FIG. 7 and the phase error detector illustrated in FIG. 8.

FIG. 9 is an explanatory diagram illustrating an example of the rough operations in the back EMF phase detector illustrated in FIG. 7 and the phase error detector illustrated in FIG. 8. As illustrated in FIG. 9, the up/down counter circuit UDCUNT1 starts the count operation when the mask signal MSK is asserted. In the present example, the BEMF amplitude BEMFO outputted from the sample hold circuit SH11 is lower than the zero cross voltage VthZ at the start time of the count operation, then reaches the zero cross voltage VthZ, and subsequently rises exceeding the zero cross voltage VthZ.

Corresponding to this change, the up/down counter circuit UDCUNT1 performs count-down until the BEMF amplitude BEMFO reaches the zero cross voltage VthZ (that is, until the zero crossing detection signal ZXOUT makes a transition), and performs count-up after the BEMF amplitude BEMFO exceeds the zero cross voltage VthZ (that is, after the zero crossing detection signal ZXOUT makes a transition). Then, the up/down counter circuit UDCUNT1 stops the count operation when the mask signal MSK is negated. The phase error detector PHED holds the final count value at the time of stopping this count operation to the register circuit corresponding to the selected phase among the register circuits REG10u, REG10v, and REG10w.

As seen from FIG. 9, when the voltage zero crossing point exists in the middle time of the assertion period of the mask signal MSK, the final count value of the up/down counter circuit UDCUNT1 becomes zero. On the other hand, when the voltage zero crossing point deviates from the middle time concerned, the final count value of the up/down counter circuit UDCUNT1 becomes a value reflecting the direction and the amount of the deviation (in other words, the voltage phase error with reference to the middle time).

Here, as described above, the PLL controller PLLCT illustrated in FIG. 2 generates the energization timing signal TIM synchronizing with the BEMF phase of the u phase by performing the PLL control to converge to zero the phase error signal ECNT of the reference phase (the u phase). The PWM modulator PWMMD generates the mask signal MSK of which the phase is different by 120 degrees respectively for the u phase, the v phase, and the w phase, based on the energization timing signal TIM synchronizing with the u phase.

Consequently, as illustrated in the period Tdet1 changing to the period Tdet2 illustrated in FIG. 9, the energization timing TIM is adjusted so that the voltage zero crossing point of the reference phase (the u phase) may be set at the middle time of the mask signal MSK. Through this adjustment, the window position of the mask signal MSK is also adjusted. The phase error detector PHED detects a phase error employing the mask signal MSK generated with reference to the u phase. Therefore, in the steady state, the phase error signal ECNT of the u phase becomes zero, and the phase error signals ECNT of the v phase and the w phase becomes an error value with reference to the zero (that is, the u phase).

«Details of the Drive Current Phase Detector»

Figure 10:
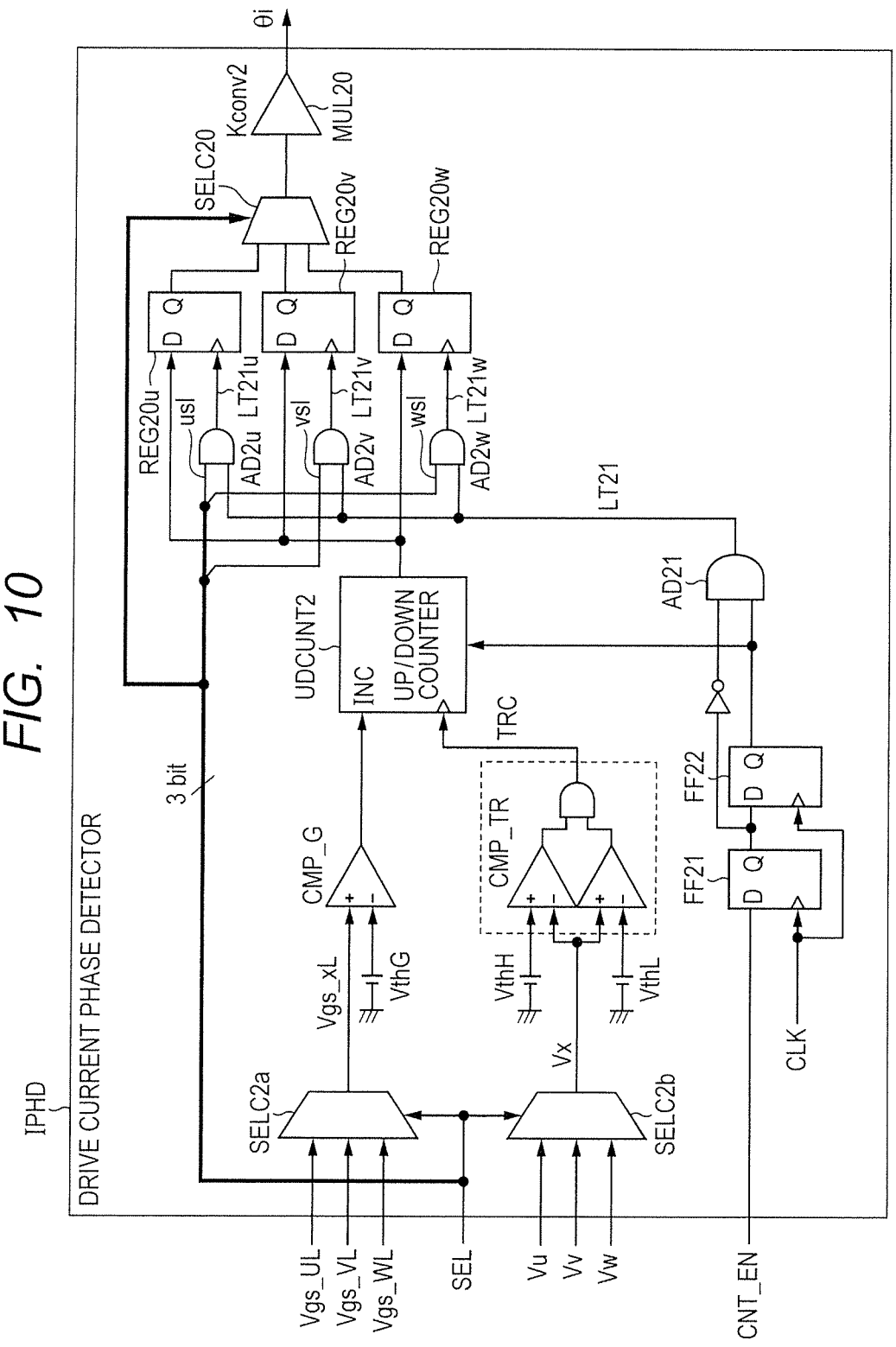
FIG. 10 is a circuit diagram illustrating an example of the detailed configuration of a drive current phase detector illustrated in FIG. 2.

FIG. 10 is a circuit diagram illustrating an example of the detailed configuration of the drive current phase detector illustrated in FIG. 2. The drive current phase detector IPHD illustrated in FIG. 10 includes selection circuits SELC2a and SELC2b, comparator circuits CMP_G and CMP_TR, an up/down counter circuit UDCUNT2, flip-flop circuits FF21 and FF22, and an AND circuit AD21. The drive current phase detector IPHD further includes AND circuits AD2u, AD2v, and AD2w, register circuits REG20u, REG20v, and REG20w, and a selection circuit SELC20 as is the example of the configuration illustrated in FIG. 8, and in addition, includes a multiplier circuit MUL20.

The selection circuit SELC2a receives gate-to-source voltages Vgs_UL, Vgs_VL, and Vgs_WL of the three-phase low-side transistors M2u, M2v, and M2w, selects one of them based on the phase selection signal SEL, and outputs it to the comparator circuit CMP_G as a gate-to-source voltage Vgs_xL. Similarly, the selection circuit SELC2b selects one of the three-phase drive voltages Vu, Vv, and Vw, based on the phase selection signal SEL, and outputs it to the comparator circuit CMP_TR as the drive voltage Vx.

The comparator circuit CMP_G compares the magnitude relation of the gate-to-source voltage Vgs_xL supplied from the selection circuit SELC2a and a predetermined threshold voltage VthG. That is, the comparator circuit CMP_G determines whether the low-side transistor of the selected phase is ON or OFF. The comparator circuit CMP_TR determines whether the drive voltage Vx supplied from the selection circuit SELC2b is in a range that is greater than the threshold voltage VthL on the low potential side and smaller than the threshold voltage VthH on the high potential side. That is, the comparator circuit CMP_TR detects the period when the drive voltage Vx makes a transition according to the PWM signal between the supply voltage VM of the high potential side and the supply voltage of the low potential side (the ground power supply voltage GND). The comparator circuit CMP_TR asserts the trigger signal TRG in the detected transition period concerned.

The flip-flop circuits FF21 and FF22 latch the drive current detection enable signal CNT_EN sequentially with the reference clock CLK of the digital control, and output it to the up/down counter circuit UDCUNT2. The up/down counter circuit UDCUNT2 is enabled during the assertion period of the drive current detection enable signal CNT_EN. In this enabled state, the up/down counter circuit UDCUNT2 performs count-down or count-up based on the comparison result of the comparator circuit CMP_G, whenever the trigger signal TRG is asserted. For example, the up/down counter circuit UDCUNT2 performs count-down when Vgs_xL<VthG (when the low-side transistor of the selected phase is in an OFF state), and performs count-up when Vgs_xL>VthG (when the low-side transistor of the selected phase is in an ON state).

The AND circuit AD21 performs an AND operation by inputting the inverted output of the flip-flop circuit FF21 and the output of the flip-flop circuit FF22, and outputs a latch signal LT21 used as a one-shot pulse signal when the drive current detection enable signal CNT_EN makes a transition from the assertion period to the negation period. The AND circuits AD2u, AD2v, and AD2w respectively perform an AND operation of two inputs of the selection signals usl, vsl, and wsl, and the latch signal LT21, and output the latch signals LT21u, LT21v, and LT21w to the register circuit REG20u, REG20v, and REG20w, respectively.

The register circuits REG20u, REG20v, and REG20w latch the count value from the up/down counter circuit UDCUNT2 in response to the latch signals LT21u, LT21v, and LT21w, respectively. The selection circuit SELC20 outputs the count value of one of the register circuits REG20u, REG20v, and REG20w based on the phase selection signal SEL. The multiplier circuit MUL20 amplifies the output of the selection circuit SELC20 with the predetermined gain Kconv2, and outputs the drive current phase θi. The gain Kconv2 is a coefficient that converts the count value into a phase.

Figure 11:
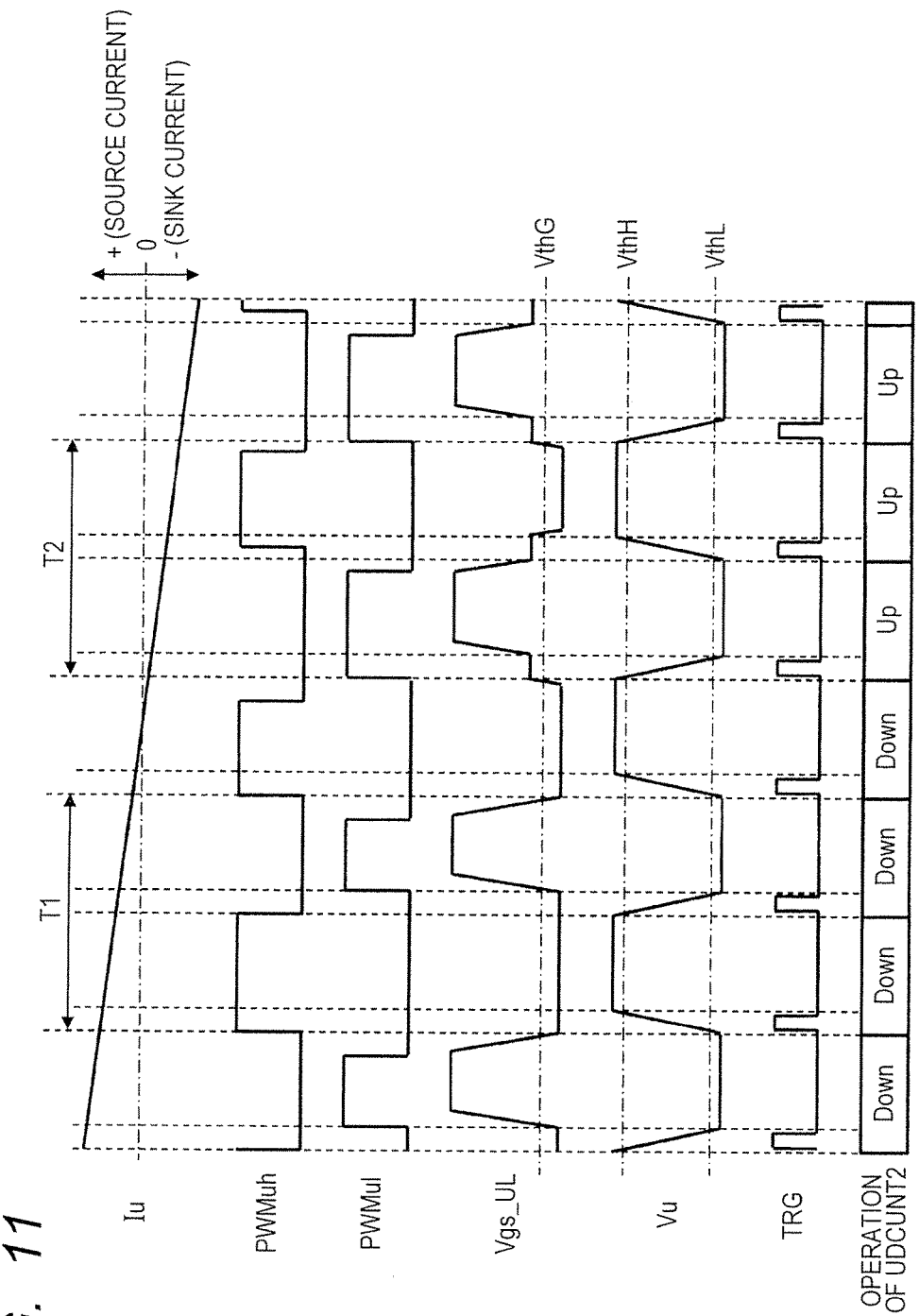
FIG. 11 is a waveform chart illustrating the principle of operation of the drive current phase detector illustrated in FIG. 10.

FIG. 11 is a waveform chart illustrating the principle of operation of the drive current phase detector illustrated in FIG. 10. FIG. 11 illustrates roughly the operating waveform of each signal at the time of the drive current Iu changing from a source current (plus current) to a sink current (minus current), for example. In the period when the source current flows, the regenerative current accompanying the PWM control flows toward the low-side transistor M2u of the u phase, and in the period when the sink current flows, the drive current accompanying the PWM control flows.

As illustrated in FIG. 11, due to the difference between the regenerative current and the drive current, in a PWM cycle T1 when the drive current Iu is the source current, a gate-to-source voltage Vgs_UL of the low-side transistor M2u becomes smaller than a predetermined threshold voltage VthG in the period when the drive voltage Vu makes a transition. That is, the low-side transistor M2u becomes in an OFF state. In a PWM cycle T2 when the drive current Iu is the sink current, on the other hand, the gate-to-source voltage Vgs_UL of the low-side transistor M2u becomes greater than the predetermined threshold voltage VthG in the period when the drive voltage Vu makes a transition. That is, the low-side transistor M2u becomes in an ON state.

In this way, the drive current phase detector IPHD illustrated in FIG. 10 determines whether the low-side transistor M2u of the selected phase is in an ON state or an OFF state, in the period when the drive voltage Vu of the selected phase (here the u phase) of the motor SPM makes a transition. Consequently, the drive current phase detector IPHD determines whether the electric current of the phase concerned is a source current or a sink current. Then, the drive current phase detector IPHD concerned detects the time of changing from one of the source current and the sink current to the other as the current zero crossing point of the drive current Iu.

Specifically, as illustrated in FIG. 11, the up/down counter circuit UDCUNT2 of the drive current phase detector IPHD performs count-down when the determination is the source current, and performs count-up when the determination is the sink current. Although omitted in FIG. 11, as is the case with the mask signal MSK illustrated in FIG. 9, the up/down counter circuit UDCUNT2 performs such a count operation in the assertion period of the drive current detection enable signal CNT_EN (refer to FIG. 6). Consequently, as is the case with FIG. 9, the drive current phase detector IPHD determines the drive current phase θi, based on the final count value at the time when the drive current detection enable signal CNT_EN is negated.

«Details of the Drive Voltage Phase Generator»

Figure 12:
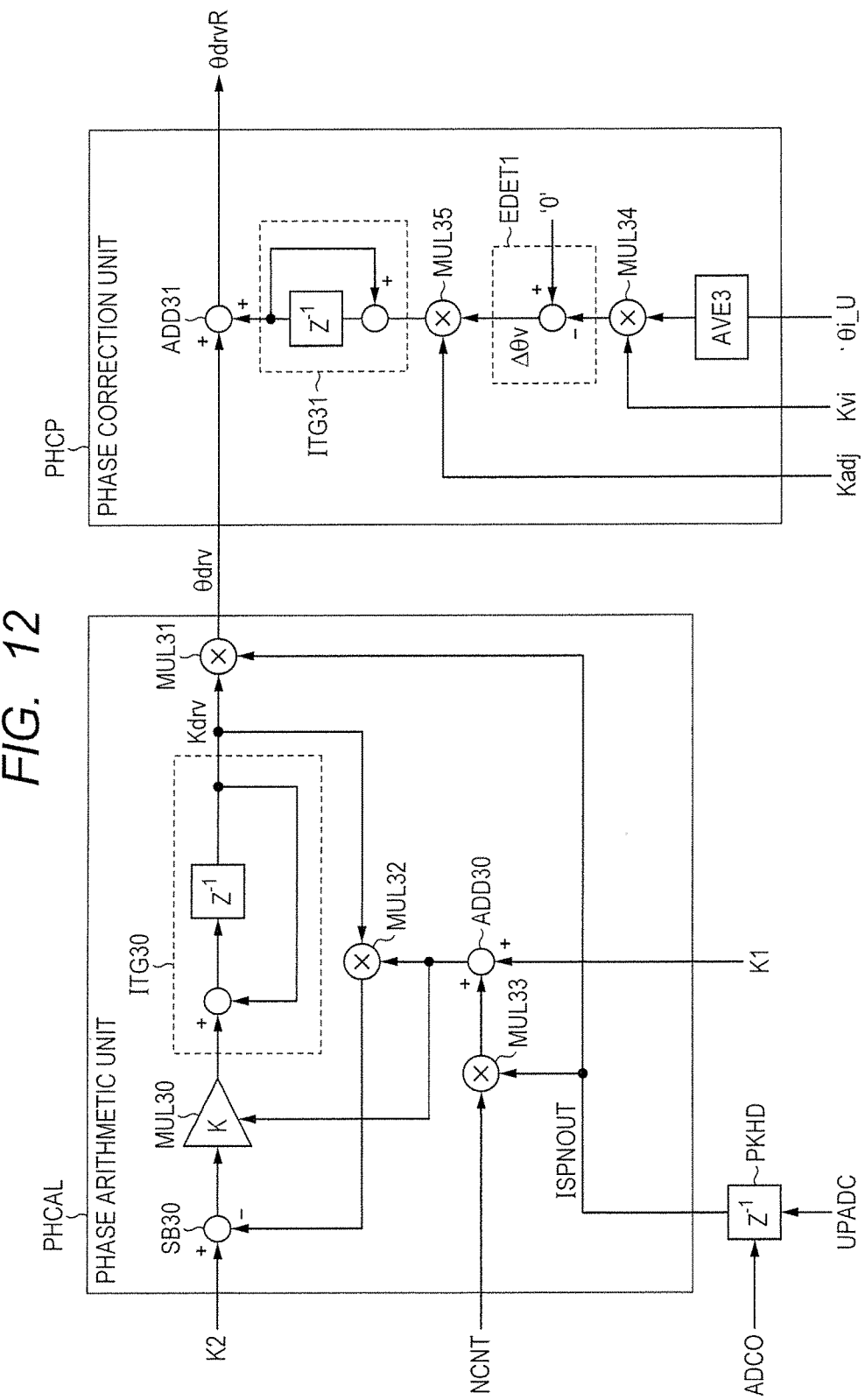
FIG. 12 is a drawing illustrating an example of the detailed configuration of a phase arithmetic unit and a phase correction unit of the drive voltage phase generator illustrated in FIG. 5.

FIG. 12 illustrates an example of the detailed configuration of the phase arithmetic unit and the phase correction unit, included in the drive voltage phase generator illustrated in FIG. 5. As illustrated in the vector diagram of FIG. 24A, in order to reduce to zero the phase difference between the phase of the back electromotive force Vbemf (for example, the reference BEMF phase θbemf of the reference phase) and the phase of the coil current Icoil (the drive current phase θi of the reference phase), it is necessary to advance the phase of the drive voltage Vdrv to the reference BEMF phase θbemf by the drive voltage phase θdrv.

This drive voltage phase θdrv is expressed by Equation (17) in terms of the angular frequency ω and the torque constant Ke of the motor SPM. In Equation (17), "ω·Ke" corresponds to the back electromotive force Vbemf illustrated in FIG. 24A.

[Equation 17]

$$\theta drv = \tan^{-1}\{\omega \cdot Lm \cdot Icoil/(\omega \cdot Ke + Rm \cdot Icoil)\} \quad (17)$$

Here, the drive voltage phase θdrv is a sufficiently small value ordinarily. In this case, "$\tan^{-1}$" can be excluded by employing the approximation expressed by Equation (18). The excluded equation is transformed to derive Equation (19).

[Equation 18]

$$\theta drv \approx \tan^{-1}(\theta drv) \quad (18)$$

[Equation 19]

$$\theta drv = (Lm/Rm) \cdot Icoil/\{(Ke/Rm) + (Icoil/\omega)\} \quad (19)$$

The phase arithmetic unit PHCAL illustrated in FIG. 12 calculates the drive voltage phase θdrv based on Equation (19). Specifically, in Equation (19), the value corresponding to "Ke/Rm" is defined by the characteristic constant K1, the value corresponding to "Lm/Rm" is defined by the characteristic constant K2, the value corresponding to "Icoil" is defined by the drive current amplitude ISPNOUT supplied from the peak holding unit PKHD, and the value corresponding to "1/ω" is defined by the rotational cycle count value NCNT. In this case, Equation (19) turns into Equation (20) and the drive voltage phase θdrv is obtained by multiplying "Kdrv" of Equation (21) by "ISPNOUT."

[Equation 20]

$$\theta drv = K2 \cdot ISPNOUT/(K1 + ISPNOUT \cdot NCNT) \quad (20)$$

[Equation 21]

$$Kdrv = K2/(K1 + ISPNOUT \cdot NCNT) \quad (21)$$

The phase arithmetic unit PHCAL illustrated in FIG. 12 includes a subtractor SB30, multipliers MUL30-MUL33, an integrator ITG30, and an adder ADD30. The multiplier MUL33 calculates "NCNT·ISPNOUT" and the adder ADD30 adds "K1" to the output of the multiplier MUL33, to calculate the denominator of Equation (21). The multiplier MUL32 multiplies the output of the adder ADD30 by "Kdrv." The subtractor SB30 calculates the error between the multiplication result of the multiplier MUL32 and "K2", and the multiplier MUL30 amplifies the error concerned by the integration gain K. The integrator ITG30 integrates the multiplication result of the multiplier MUL30 to calculate "Kdrv" of Equation (21).

That is, the phase arithmetic unit PHCAL illustrated in FIG. 12 includes an arithmetic circuit that calculates "Kdrv" by performing the feedback control on "Kdrv" so that the error between the multiplication result by the multiplier MUL32 (that is, "Kdrv·(K1+ISPNOUT·NCNT)") and "K2" may converge to zero. When the error has converged to zero, "Kdrv·(K1+ISPNOUT·NCNT)" becomes equal to "K2", and, as a result, "Kdrv" becomes a value expressed by Equation (21). The multiplier MUL31 calculates the drive voltage phase θdrv of Equation (20) by multiplying "Kdrv" By "ISPNOUT."

In this way, by employing the arithmetic circuit utilizing a feedback control, Equation (20) can be evaluated without employing a divider that can have a complicated configuration; accordingly, it is possible to attain simplification of the circuit configuration. Here, the multiplier MUL30 has a configuration in which the integration gain K is variably controlled according to the calculation result of the adder ADD30. Specifically, the integration gain K is controlled to become smaller gradually, as the output of the adder ADD30 becomes larger, for example. Accordingly, it is possible to keep the band of the feedback control to the same degree, irrespective of the magnitude of the output of the adder ADD30.

The phase correction unit PHCP illustrated in FIG. 12 includes an averaging circuit AVE3, multipliers MUL34 and MUL35, an error detector EDET1, an integrator ITG31, and an adder ADD31. The averaging circuit AVE3 averages the inputted drive current phase θi in chronological order. The multiplier MUL34 multiplies the averaged drive current phase θi concerned by a gain adjustment parameter Kvi. The error detector EDET1 detects a phase error Δθv between the zero point phase and the multiplication result of the multiplier MUL34. That is, as illustrated in FIG. 9, the phase error of the reference BEMF phase θbemf becomes zero in the steady state. Accordingly, the phase error between the drive current phase θi and the reference BEMF phase θbemf corresponds to the phase error between the drive current phase θi and the zero point phase.

The multiplier MUL35 multiplies the detection result (Δθv) of the error detector EDET1 by a gain adjustment parameter (that is, an integration gain) Kadj, and the integrator ITG31 calculates a correction value by integrating the multiplication result of the multiplier MUL35. The adder ADD31 adds the correction value calculated by the integrator ITG31 to the drive voltage phase θdrv outputted from the phase arithmetic unit PHCAL to calculate the reference drive voltage phase θdrvR. The gain adjustment parameter Kvi is a coefficient that adjusts the sensitivity of the reference drive voltage phase θdrvR to the change of the drive current phase θi.

Figure 13:
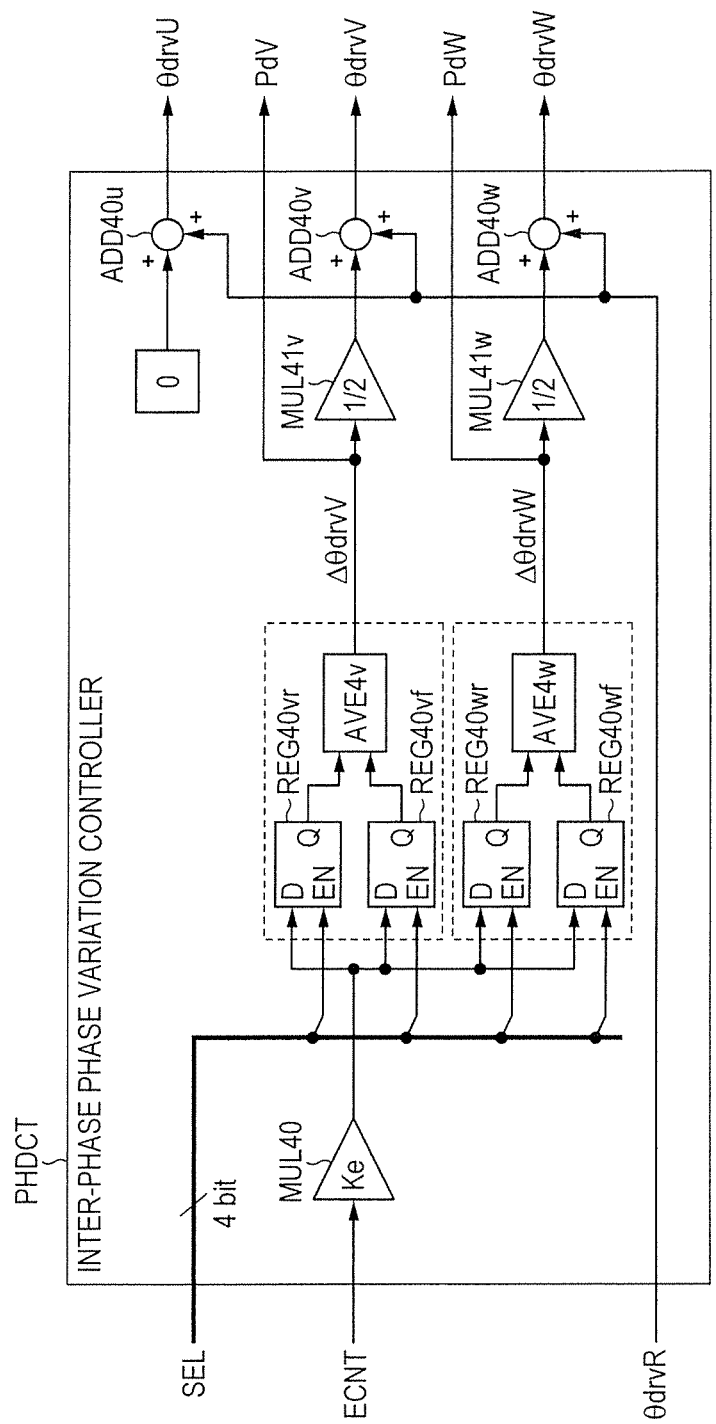
FIG. 13 is a drawing illustrating an example of the detailed configuration of an inter-phase phase variation controller of the drive voltage phase generator illustrated in FIG. 5.

FIG. 13 illustrates an example of the detailed configuration of the inter-phase phase variation controller included in the drive voltage phase generator illustrated in FIG. 5. The inter-phase phase variation controller PHDCT illustrated in FIG. 13 includes multipliers MUL40, MUL41v, and MUL41w, register circuits REG40vr, REG40vf, REG40wr, and REG40wf, averaging circuits AVE4v and AVE4w, and adders ADD40u, ADD40v, and ADD40w.

The multiplier MUL40 multiplies a phase error signal ECNT as the count value outputted from the phase error detector PHED by a phase error detection gain Ke. The phase error detection gain Ke is a coefficient to convert the count value to the phase. The register circuit REG40vr holds the amount of correction at the rising edge of the v phase outputted from the multiplier MUL40, according to the phase selection signal SEL. The register circuit REG40vf holds the amount of correction at the falling edge of the v phase outputted from the multiplier MUL40, according to the phase selection signal SEL. Similarly, the register circuits REG40wr and REG40wf hold the amount of correction at the rising edge and the falling edge of the w phase. The adder ADD40u outputs a drive voltage phase θdrvU of the u phase by adding zero to the reference drive voltage phase θdrvR.

The averaging circuit AVE4v calculates the amount of correction ΔθdrvV of the v phase by averaging the output value of the register circuits REG40vr and REG40vf. The inter-phase phase variation controller PHDCT outputs the amount of correction ΔθdrvV of the v phase (equal to an electrical angle Δθbemf_V of the phase variations of the BEMF of the v phase) as a phase variation signal PdV. The multiplier MUL41v multiplies the amount of correction ΔθdrvV of the v phase by "½", and the adder ADD40v adds the multiplication result of the multiplier MUL41v to the drive voltage phase θdrvR, to output the drive voltage phase θdrvV of the v phase.

For example, with reference to FIG. 24B, when the BEMF phase θbemf_U of the v phase shifts by Δθbemf with reference to the reference BEMF phase θbemf, the relative relation of the vectors as shown in FIG. 24A can be maintained by sifting the drive voltage phase θdrvV of the v phase by the same amount of Δθbemf. As a result, it is possible to set the BEMF phase and the drive current phase of the v phase as the same phase.

In order to shift the drive voltage phase θdrvV of the v phase by ΔθdrvV, in practice, it is sufficient to add half the correction value of ΔθdrvV (½·ΔθdrvV) to the reference drive voltage phase θdrvR by the multiplier MUL41v. This is because the drive voltage phase θdrv of each phase is calculated on the basis of the phase of the neutral point CT. In the case of actually driving the motor SPM, a differential drive voltage is applied to each phase by assuming the neutral point CT as a virtual ground. On the assumption of such a differential operation, in order to shift the drive voltage phase θdrvV of the v phase by ΔθdrvV with reference to the drive voltage phase θdrvU of the u phase for example, it is sufficient to add half the correction value of ΔθdrvV to the v phase, assuming the phase of the neutral point CT as the basis.

The similar operation as for the v phase is performed also for the w phase. That is, the averaging circuit AVE4w calculates the amount of correction ΔθdrvW for the w phase by averaging the output values of the register circuits REG40wr and REG40wf. The inter-phase phase variation controller PHDCT outputs the amount of correction ΔθdrvW of the w phase (equal to an electrical angle Δθbemf_W of the phase variations of the BEMF of the w phase) as a phase variation signal PdW. The multiplier MUL41w multiplies the amount of correction ΔθdrvW of the w phase by "½", and the adder ADD40w outputs the drive voltage phase θdrvW of the w phase by adding the multiplication result of the multiplier MUL41w to the drive voltage phase θdrvR.

In this example, the PWM modulator PWMMD illustrated in FIG. 2 detects the voltage zero crossing point at the rising edge of the three-phase BEMF and the voltage zero crossing point at the falling edge, respectively. Accordingly, the PWM modulator PWMMD outputs sequentially six mask signals MSK each having a different position of the electrical angle. In parallel to the output of the mask signal MSK, the PWM modulator PWMMD outputs a phase selection signal SEL to specify that the mask signal MSK concerned corresponds to which one of the six mask signals MSK. Furthermore, although not shown in the figure, also when the phase error of the reference phase (the u phase) is detected by the phase error detector PHED illustrated in FIG. 8, it is preferable to provide an averaging circuit as is the case with FIG. 13, and to detect an average phase error signal ECNT at the rising edge and the falling edge.

«Details of the Inter-Phase Amplitude Variation Detector»

Figure 14:
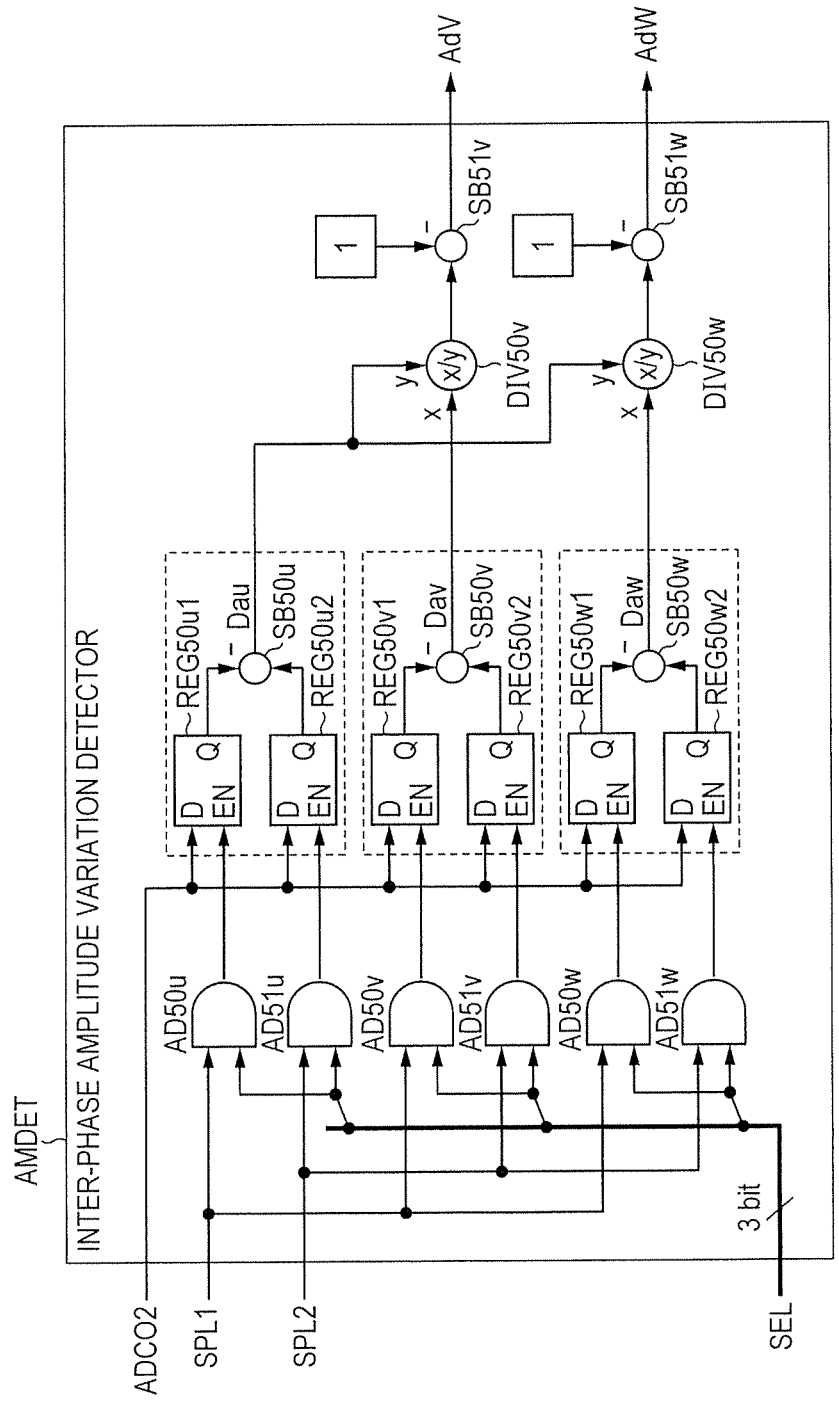
FIG. 14 is a drawing illustrating an example of the detailed configuration of an inter-phase amplitude variation detector illustrated in FIG. 2.

FIG. 14 illustrates an example of the detailed configuration of the inter-phase amplitude variation detector illustrated in FIG. 2. The inter-phase amplitude variation detector AMDET illustrated in FIG. 14 includes AND circuits AD50u, AD50v, AD50w, AD51u, AD51v, and AD51w, register circuits REG50u1, REG50u2, REG50v1, REG50v2, REG50w1, and REG50w2, subtraction units SB50u, SB50v, and SB50w, dividers DIV50v and DIV50w, and subtraction units SB51v and SB51w.

When the selected phase by the phase selection signal SEL is the u phase, the output of the AND circuit AD50u is asserted in the assertion period of the sampling signal SPL1, and the output of the AND circuit AD51u is asserted in the assertion period of the sampling signal SPL2. Similarly, when the selected phase is the v phase, the output of the AND circuit AD50v is asserted according to the sampling signal SPL1, and the output of the AND circuit AD51v is asserted according to the sampling signal SPL2. When the selected phase is the w phase, the output of the AND circuit AD50w is asserted according to the sampling signal SPL1, and the output of the AND circuit AD51w is asserted according to the sampling signal SPL2. The sampling signals SPL1 and SPL2 are generated by the PWM modulator PWMMD illustrated in FIG. 2.

The register circuits REG50u1, REG50u2, REG50v1, REG50v2, REG50w1, and REG50w2 latch, respectively, a digital value ADCO2 outputted from the analog-to-digital converter ADC2, responding to the assertion of the output of the AND circuits AD50u, AD51u, AD50v, AD51v, AD50w, and AD51w. The subtraction unit SB50u calculates the difference of the output value of the register circuit REG50u2 and the output value of the register circuit REG50u1, and outputs the difference concerned as aback EMF (electromotive force) amplitude Dau of the u phase. Similarly, the subtraction unit SB50v calculates the difference for the register circuits REG50v1 and REG50v2, and outputs a back EMF amplitude Dav of the v phase, and the subtraction unit SB50w calculates the difference for the register circuits REG50w1 and REG50w2, and outputs a back EMF amplitude Daw of the w phase.

Assuming that the back EMF amplitude Dau of the u phase is 'y' and the back EMF amplitude Dav of the v phase is 'x', the divider (amplitude-ratio arithmetic unit) DIV50v calculates "x/y." The subtraction unit SB51v calculates the amplitude variation signal AdV of the v phase by subtracting "1" from the calculation result of the divider DIV50v. Similarly, assuming that the back EMF amplitude Dau of the u phase is 'y' and the back EMF amplitude Daw of the w phase is 'x', the divider (amplitude-ratio arithmetic unit) DIV50w calculates "x/y." The subtraction unit SB51w calculates the amplitude variation signal AdW of the w phase by subtracting "1" from the calculation result of the divider DIV50w.

Figure 15:
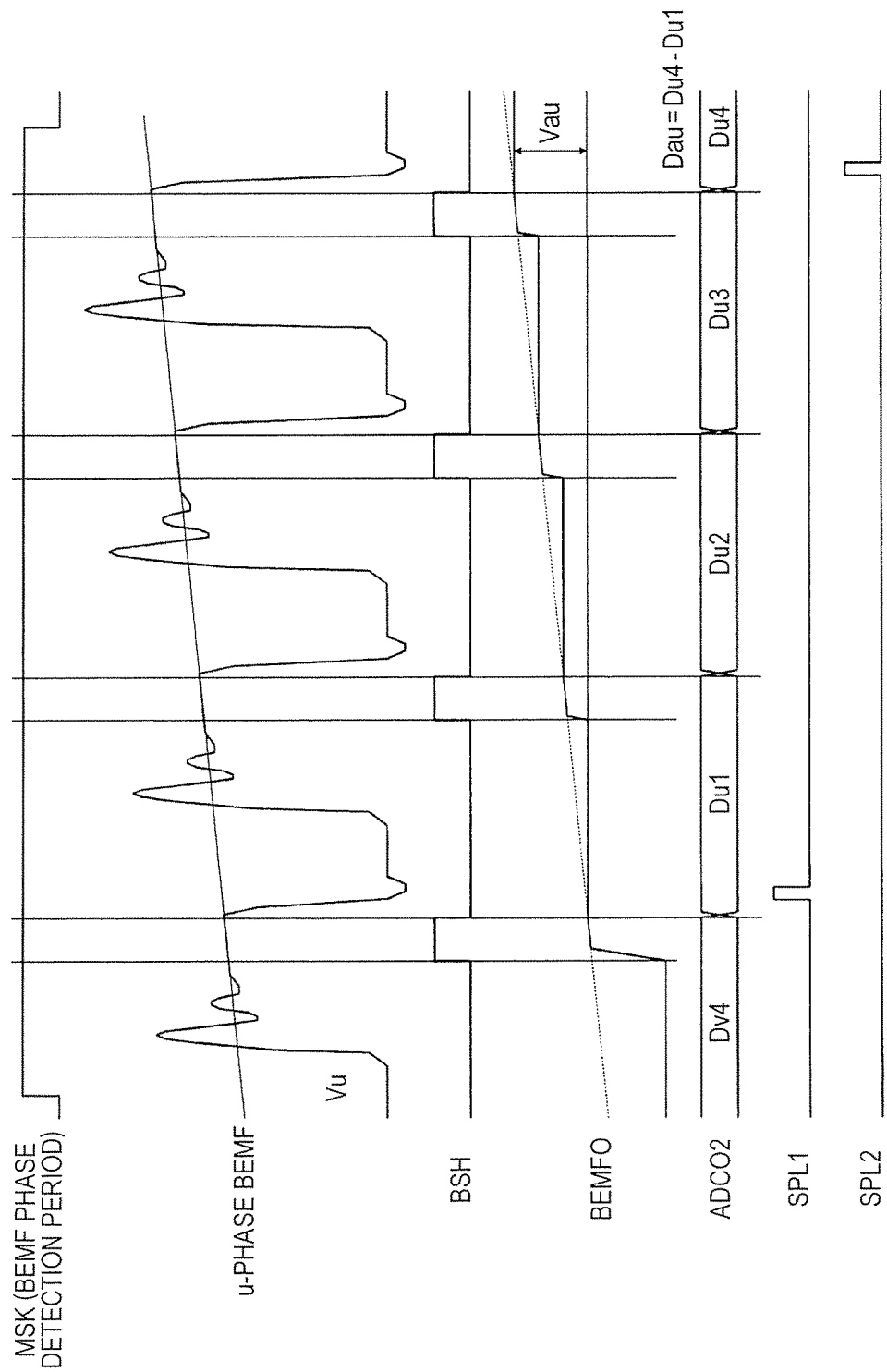
FIG. 15 is a waveform chart explaining an example of operations of the inter-phase amplitude variation detector illustrated in FIG. 14.

FIG. 15 is a waveform chart explaining an example of operations of the inter-phase amplitude variation detector illustrated in FIG. 14. As a premise, in the state where the driving terminal of the selected phase is set as the high impedance in the assertion period of the mask signal MSK, the back EMF phase detector (the back EMF amplitude detector) BPHD illustrated in FIG. 7 performs the multiple time-series sampling of the voltage (Vu, Vv, or Vw) at the driving terminal concerned in response to the sampling signal BSH, in the assertion period concerned. The sampling signal BSH is asserted for each PWM cycle. Then, the back EMF phase detector BPHD performs the multiple sampling and outputs sequentially the sampling voltage (that is, the back EMF amplitude BEMFO). The analog-to-digital converter ADC2 outputs the digital value ADCO2 of the back EMF amplitude BEMFO concerned.

The inter-phase amplitude variation detector AMDET illustrated in FIG. 14 functions as a part of the back EMF amplitude detector. The inter-phase amplitude variation detector AMDET calculates a difference of two sampling voltages determined in advance out of the multiple (four in the example illustrated in FIG. 15) sampling voltages (that is, the digital value ADCO2), and detects the difference concerned as the back EMF amplitude. In the example illustrated in FIG. 15, in the state where the selected phase is the u phase, for example, a sampling signal SPL1 is asserted in the output period of the digital value Du1 accompanying the first sampling voltage by the analog-to-digital converter ADC2, and a sampling signal SPL2 is asserted in the output period of the digital value Du4 accompanying the fourth sampling voltage.

The inter-phase amplitude variation detector AMDET latches the digital value Du1 to the register circuit REG50*u*1 and the digital value Du4 to the register circuit REG50*u*2, and detects the difference (Du4−Du1) as the back EMF amplitude Dau. That is, the inter-phase amplitude variation detector AMDET detects the amount of fluctuation of the BEMF in the assertion period of the mask signal MSK as the back EMF amplitude.

By employing such a system, it becomes possible to detect the back EMF amplitude with a high degree of accuracy. That is, as described with reference to FIG. 9 for example, the assertion period of the mask signal MSK is always maintained to be a constant interval (for example, 15 degrees) with the middle time at the voltage zero crossing point of the BEMF of the reference phase by the aid of PLL controller PLLCT. Therefore, the detection period of the BEMF amplitude as well does not vary on the time-axis, but is maintained in the range of the always-same electrical angle within 360 degrees. The mask signal MSK and the PWM cycle are synchronized with each other. Accordingly, the timing at which the sampling signals SPL1 and SPL2 are asserted in the detection period of the BEMF amplitude is also fixed. As a result, the detection accuracy of the back EMF amplitude increases.

A part of the circuit for detecting the back EMF phase is used in common for detecting the back EMF amplitude. Accordingly, the overhead of the circuit area may be suppressed. Here, the analog-to-digital converter ADC2 for detecting the back EMF amplitude is provided separately. However, the analog-to-digital converter ADC2 concerned may be used in common with the analog-to-digital converter ADC. That is, the analog-to-digital converter ADC is not necessary to detect the phase current always and can detect the back EMF amplitude in the idle period.

《Details of the Torque Correction Unit》

Figure 16:
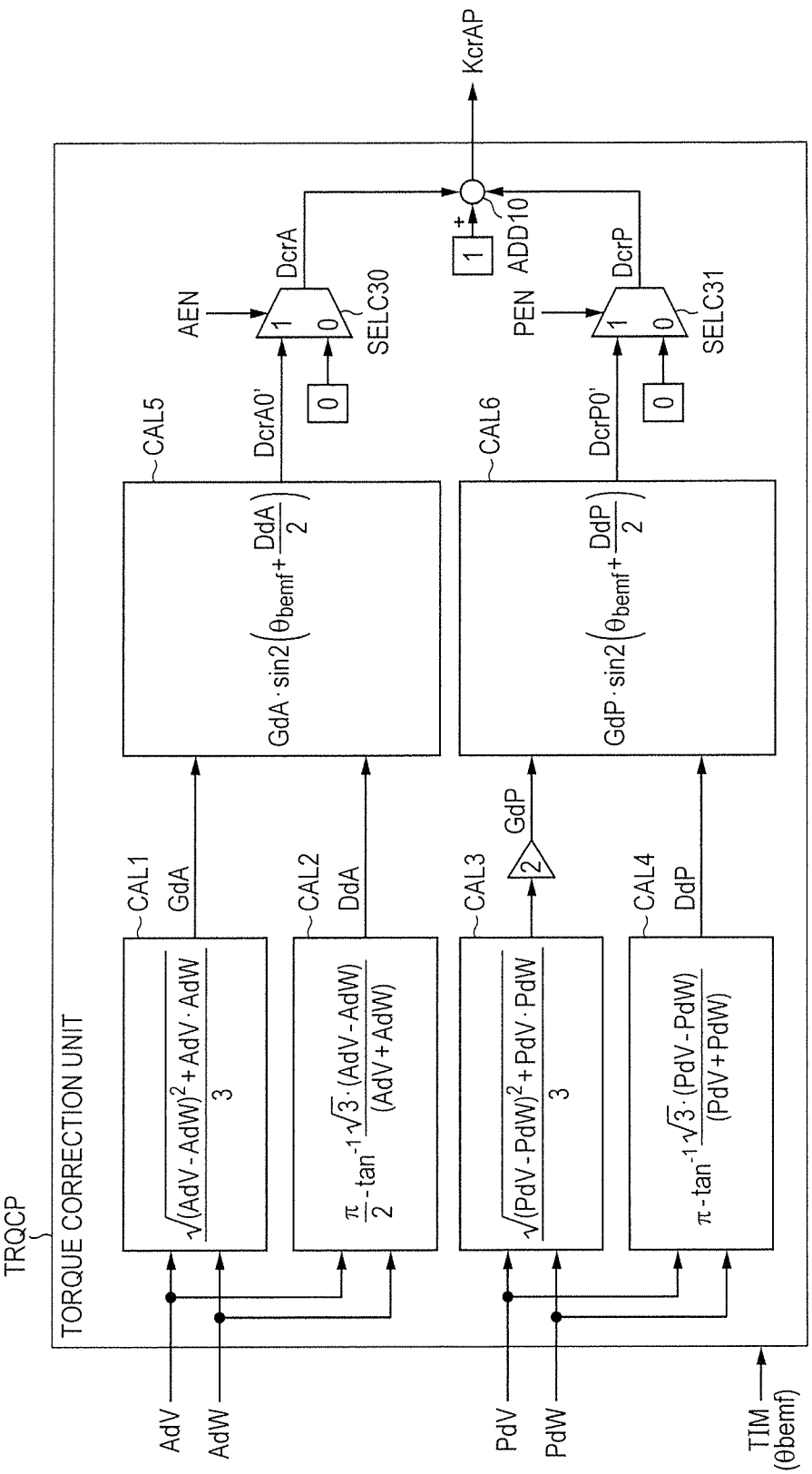
FIG. 16 is a drawing illustrating an example of the detailed configuration of a torque correction unit illustrated in FIG. 2.

FIG. 16 illustrates an example of the detailed configuration of the torque correction unit illustrated in FIG. 2. The torque correction unit TRQCP illustrated in FIG. 16 includes arithmetic units CAL1-CAL6, selection circuits SELC30 and SELC31, and an adder ADD10. The arithmetic unit CAL1 receives the amplitude variation signals AdV and AdW of the v phase and the w phase, and calculates GdA of Equation (15). The arithmetic unit CAL2 receives the amplitude variation signals AdV and AdW of the v phase and the w phase, and calculates DdA of Equation (16).

The arithmetic unit CAL3 receives the phase variation signals PdV and PdW of the v phase and the w phase, and calculates GdP of Equation (7). The arithmetic unit CAL4 receives the phase variation signals PdV and PdW of the v phase and the w phase, and calculates DdP of Equation (8). The arithmetic unit CAL5 receives GdA and DdA from the arithmetic units CAL1 and CAL2, and calculates the term (DcrA0′) of the periodic function (the sine function) in the amplitude-specific torque correction coefficient DcrA0 of Equation (13). The arithmetic unit CAL6 receives GdP and DdP from the arithmetic units CAL3 and CAL4, and calculates the term (DcrP0′) of the periodic function (the sine function) in the phase-specific torque correction coefficient DcrP0 of Equation (5). In this case, the arithmetic units CAL5 and CAL6 perform the calculation, updating the parameter value of the reference BEMF phase θbemf sequentially based on the energization timing signal TIM. This update cycle may be the same as the PWM cycle, for example.

The selection circuit SELC30 outputs one of the arithmetic result of the arithmetic unit CAL5 or zero, responding to the amplitude-specific torque correction enable signal AEN. Consequently, whether the amplitude-specific torque correction coefficient DcrA0 is superimposed on the current indication value SPNCR or not is selected. The selection circuit SELC31 outputs one of the arithmetic result of the arithmetic unit CAL6 or zero, responding to the phase-specific torque correction enable signal PEN. Consequently, whether the phase-specific torque correction coefficient DcrP0 is superimposed on the current indication value SPNCR or not is selected. The value of each torque correction enable signal (AEN, PEN) can be set by use of the parameter setting register PREG illustrated in FIG. 2. The adder ADD10 adds "1" (that is, the constant term of Equation (13) and Equation (5)) to the output of the selection circuits SELC30 and SELC31 to calculate the torque correction coefficient KcrAP.

The arithmetic units CAL1-CAL6 are configured with logic circuits combined with a table that defines the value of a sine function or a $\tan^{-1}$ function, depending on circumstances. When sufficient computing speed can be obtained, it is also possible to configure the arithmetic units CAL1-CAL6 with a processor.

Here, although not restricted in particular, the values of the amplitude variation signals AdV and AdW or the phase variation signals PdV and PdW are determined by performing predetermined detecting operation using the mask signal MSK, at the time of start of the motor system or change of the outside environment, for example. On the other hand, at the time of the steady rotation of the motor SPM, the detecting operation (the generation of the mask signal MSK, etc.) is stopped, and the current indication value SPNCR is corrected by the torque correction coefficient KcrAP calculated using the detected value. In this way, the correction using the torque correction coefficient KcrAP does not need to be performed in particular in the period except the time of the steady rotation of the motor SPM. Accordingly, in the configuration illustrated in FIG. 16, the selection circuits SELC30 and SELC31 can select zero.

Depending on circumstances, if the amplitude-specific torque correction coefficient DcrA0 is reflected on the current indication value SPNCR, for example, the amplitude-specific torque correction coefficient DcrA0 and the phase-specific torque correction coefficient DcrP0 may interfere mutually, such that the value of the phase variation signals PdV and PdW may change a little. Accordingly, for example, when one of the torque correction coefficients is reflected on the current indication value SPNCR and when it is necessary to perform operations to determine the value of the other variation signal, the selection circuits SELC30 and SELC31 may be utilized.

Main Effects of Embodiment 1

As described above, by employing the motor driving device and the motor system according to Embodiment 1, representatively, it is possible to reduce the torque ripple of the motor SPM, even if the magnetization variations exist in the motor SPM. Consequently, it is possible to achieve the low vibration and low noise of the motor SPM. It is also possible to achieve the cost reduction of the motor SPM because the requirements to the manufacturing processes (the processing accuracy, the assembly accuracy, etc.) of the motor SPM can be relaxed.

Figure 25:
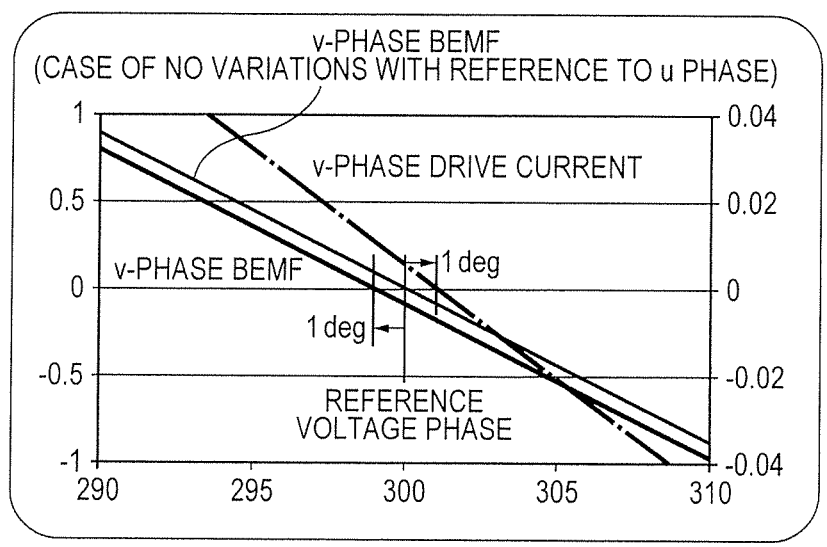
FIG. 25 is an explanatory drawing illustrating an example of the reduction system of the torque ripple, in a motor driving device as a comparative example (2) of the present invention.

FIG. 25 is an explanatory drawing illustrating an example of the reduction system of the torque ripple, in the motor driving device as a comparative example (2) of the present invention. As described above, the torque of each phase is given by a function of "BEMF×drive current." Therefore, as illustrated in FIG. 25, when the BEMF phase of the v phase leads by one degree for example, the drive current phase is lagged by one degree. Consequently, the variations are offset by multiplication and it becomes possible to reduce the torque ripple. As a concrete system, in FIG. 13 for example, the amount of correction ΔθdrvV and ΔθdrvW may be determined by multiplying the phase error signal ECNT by the coefficient of Equation (22).

[Equation 22]

$$\frac{d\theta_{drv}}{d(\Delta\theta_{bemf})} = \frac{V_{bemf}^2 - Z_m^2 \cdot I_{coil}^2}{V_{bemf}^2 + Z_m^2 \cdot I_{coil}^2 + 2V_{bemf} \cdot Z_m \cdot I_{coil} \cdot \cos(2\Delta\theta_{bemf} - \theta_z)} \quad (22)$$

Equation (22) is the adjustment gains for setting the amount (Δθbemf) of variations of the BEMF phase and the amount (Δθi) of the variations of the drive current phase such that the relation Δθi=−Δθbemf is satisfied. However, Equation (22) includes the impedance Zm and the drive current value (Icoil) of the motor SPM. These factors may change according to the environmental changes, such as temperature. Accordingly, it is necessary to prepare several values of the impedance Zm in advance manually for example, supposing various kinds of environmental changes. On the other hand, in the system according to Embodiment 1, when an environmental change occurs, it is sufficient to update the values of the phase variation signals PdV and PdW and the values of the amplitude variation signals AdV and AdW, through the detecting operation. Accordingly, it is possible to respond easily to the environmental changes.

Figure 27:
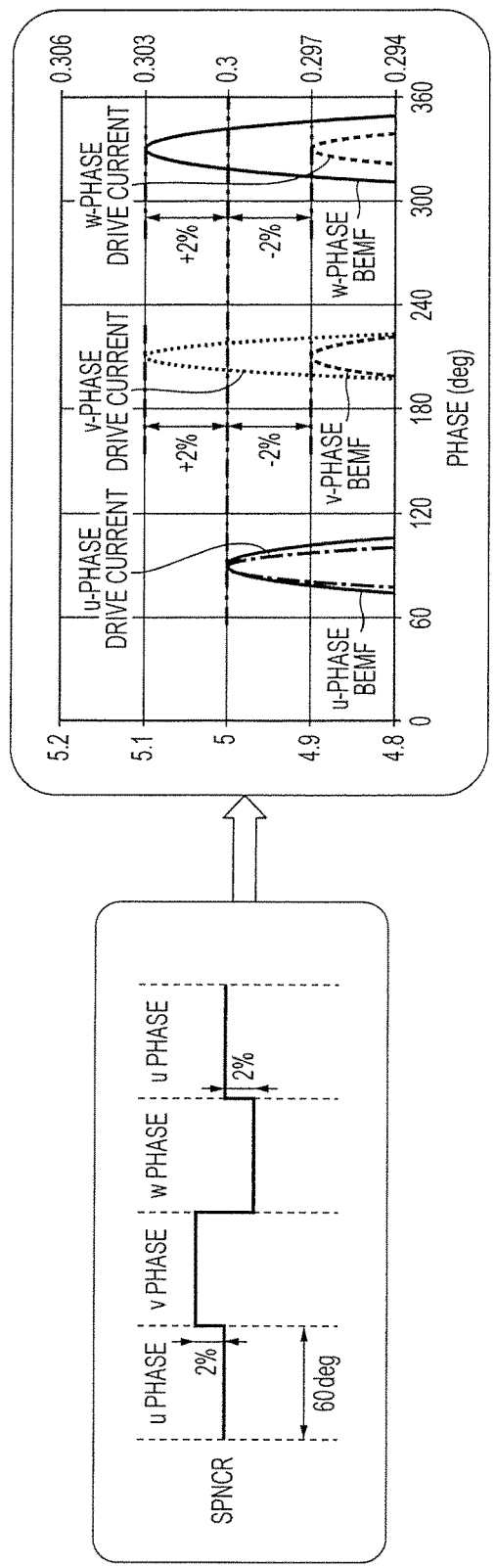
FIG. 27 is an explanatory drawing illustrating another example of the reduction system of the torque ripple, in a motor driving device as a comparative example (3) of the present invention.

FIG. 27 is an explanatory drawing illustrating another example of the reduction system of the torque ripple, in the motor driving device as a comparative example (3) of the present invention. As described with reference to FIG. 4, when the BEMF amplitude of the v phase is smaller by 2% with reference to the u phase, the drive current amplitude is enlarged by 2% to reduce the torque ripple. Therefore, as illustrated in FIG. 27, it is possible to suppose the system in which the current indication value SPNCR is corrected step-wise for every 60 degrees, according to the amplitude variations of each phase, for example. However, in such a system, the sixth order torque ripple may occur due to the step-wise switching for every 60 degrees. On the other hand, in the system according to Embodiment 1, such a problem does not arise.

Embodiment 2

《Details of the Torque Correction Unit (Application)》

Figure 17:
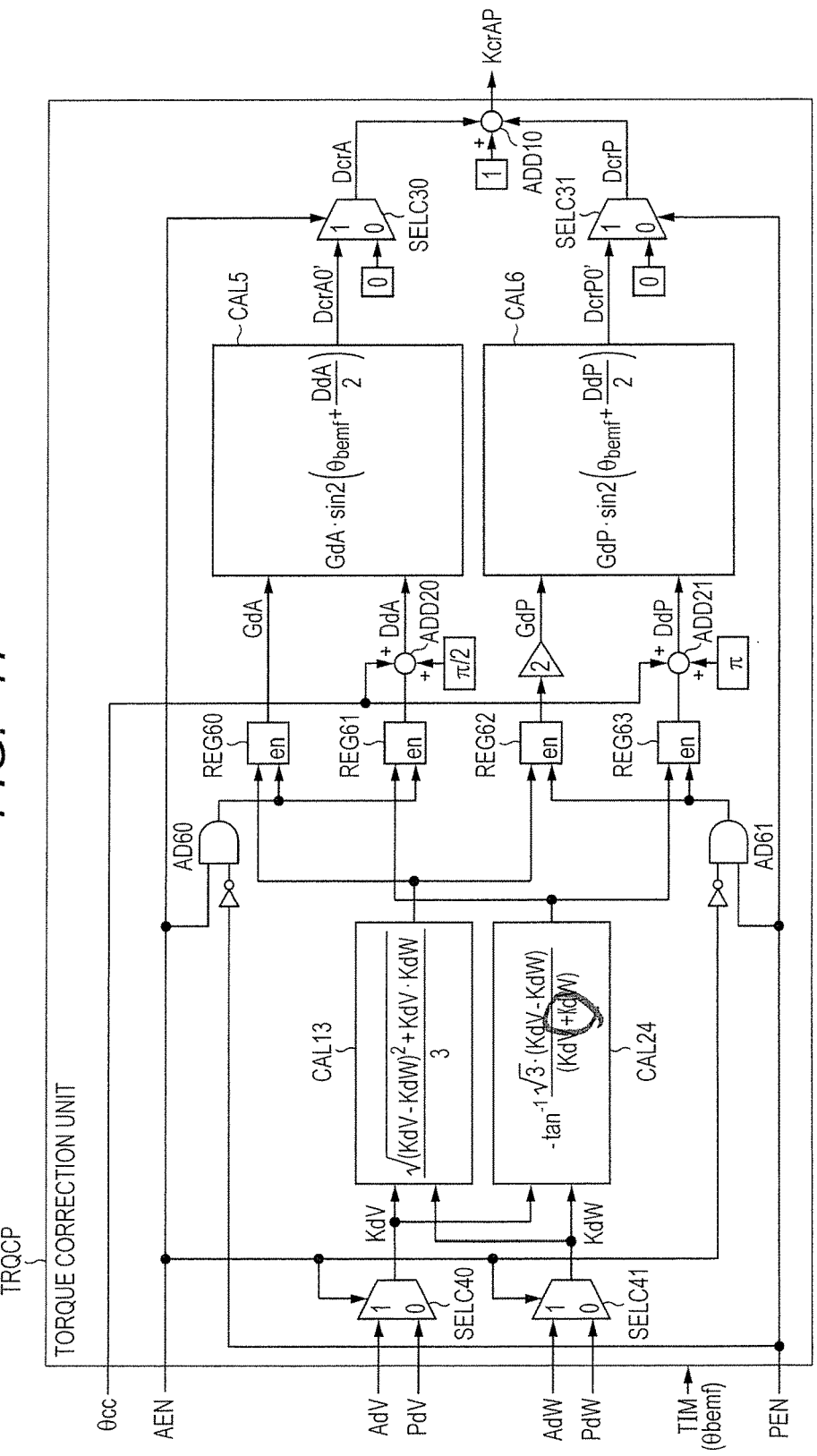
FIG. 17 is a drawing illustrating an example of the detailed configuration of the torque correction unit illustrated in FIG. 2, in a motor driving device according to Embodiment 2 of the present invention.

FIG. 17 illustrates an example of the detailed configuration of the torque correction unit illustrated in FIG. 2, in the motor driving device according to Embodiment 2 of the present invention. The torque correction unit TRQCP illustrated in FIG. 17 includes the arithmetic units CAL5 and CAL6, the selection circuits SELC30 and SELC31, and the adder ADD10, as is the case with FIG. 16. In addition, the torque correction unit TRQCP concerned includes selection circuits SELC40 and SELC41, arithmetic units CAL13 and CAL24, AND circuits AD60 and AD61, register circuits REG60-REG63, and adders ADD20 and ADD21.

The arithmetic unit CAL13 has function to be used in common by the arithmetic units CAL1 and CAL3 illustrated in FIG. 16, and calculates the function of Equation (23) including parameters KdV and KdW. That is, the arithmetic units CAL1 and CAL3 calculate the same function as Equation (23) using different parameters, and the arithmetic unit CAL13 calculates the function concerned by switching the different parameters with the use of the selection circuits SELC40 and SELC41.

[Equation 23]

$$\sqrt{((KdV-KdW)^2+KdV \cdot KdW)/3} \quad (23)$$

The arithmetic unit CAL24 has function to be used in common by the arithmetic units CAL2 and CAL4 illustrated in FIG. 16, and calculates the function of Equation (24) including parameters KdV and KdW. That is, the arithmetic units CAL2 and CAL4 calculate the same function as Equation (24) using different parameters, and the arithmetic unit CAL24 calculates the function concerned by switching the different parameters with the use of the selection circuits SELC40 and SELC41.

[Equation 24]

$$-\tan^{-1}(\sqrt{3} \cdot (KdV-KdW)/(KdV+KdW)) \quad (24)$$

The selection circuits SELC40 and SELC41 select whether to set the amplitude variation signals AdV and AdW of the v phase and the w phase to the parameters KdV and KdW, respectively, or to set the phase variation signals PdV and PdW of the v phase and the w phase to the parameters KdV and KdW, respectively. Specifically, the selection circuits SELC40 and SELC41 set the amplitude variation signals AdV and AdW to the parameters KdV and KdW respectively, when the amplitude-specific torque correction enable signal AEN is asserted. On the other hand, the selection circuits SELC40 and SELC41 set the phase variation signals PdV and PdW to the parameters KdV and KdW respectively, when the amplitude-specific torque correction enable signal AEN is negated.

The AND circuit AD60 enables the register circuits REG60 and REG61 when the amplitude-specific torque correction enable signal AEN is asserted, and when the phase-specific torque correction enable signal PEN is negated. On the other hand, the AND circuit AD61 enables the register circuits REG62 and REG63 when the amplitude-specific torque correction enable signal AEN is negated, and when the phase-specific torque correction enable signal PEN is asserted.

When the torque correction enable signal AEN is asserted and the torque correction enable signal PEN is negated, the register circuit REG60 latches the arithmetic result of the arithmetic unit CAL13, and the register circuit REG61 latches the arithmetic result of the arithmetic unit CAL24. The output of the register circuit REG60 becomes the amplitude parameter (GdA) of Equation (15), and the output of the register circuit REG61 becomes the phase parameter (DdA) of Equation (16), after "$\pi/2$+band compensation value $\theta cc$" is added by the adder ADD20.

When the torque correction enable signal AEN is negated and the torque correction enable signal PEN is asserted, on the other hand, the register circuit REG62 latches the arithmetic result of the arithmetic unit CAL13, and the register circuit REG63 latches the arithmetic result of the arithmetic unit CAL24. The output of the register circuit REG62 becomes the amplitude parameter (GdP) of Equation (7), after "2" is multiplied, and the output of the register circuit REG63 becomes the phase parameter (DdP) of Equation (8), after "$\pi$+band compensation value $\theta cc$" is added by the adder ADD21.

As is the case with FIG. 16, the arithmetic unit CAL5 calculates the periodic function, with the amplitude (GdA) reflecting the arithmetic result of the arithmetic unit CAL13 and the phase (DdA) reflecting the arithmetic result of the arithmetic unit CAL24 as parameters. Consequently, the arithmetic unit CAL5 calculates the term (DcrA0') of the periodic function (the sine function) in the amplitude-specific torque correction coefficient DcrA0 of Equation (13). Similarly, the arithmetic unit CAL6 calculates the periodic function, with the amplitude (GdP) reflecting the arithmetic result of the arithmetic unit CAL13 and the phase (DdP) reflecting the arithmetic result of the arithmetic unit CAL24 as parameters. Consequently, the arithmetic unit CAL6 calculates the term (DcrP0') of the periodic function (the sine function) in the phase-specific torque correction coefficient DcrP0 of Equation (5).

Here, the band compensation value $\theta cc$ is a value to compensate the delay in the current control loop, and can be set by the parameter setting register PREG illustrated in FIG. 2. That is, the arithmetic units CAL5 and CAL6 perform calculations, receiving the reference BEMF phase $\theta bemf$ synchronizing with the rotation of the motor SPM from the PLL controller PLLCT. However, in a precise sense, this arithmetic result is reflected to the motor SPM through the delay in the current control loop including the PI compensator PICP, etc. Therefore, in order to synchronize the phase of the torque correction coefficient KcrAP with the reference BEMF phase $\theta bemf$ on the motor SPM, the band compensation value $\theta cc$ corresponding to the delay in the current control loop is employed. The band compensation value $\theta cc$ concerned is applied also to the configuration illustrated in FIG. 16 in practice.

As described above, by employing the motor driving device and the motor system according to Embodiment 2, it is possible to achieve the reduction of the circuit scale through the communality of the arithmetic units, in addition to the various kinds of effects described in Embodiment 1. In the actual operation, for example, first, GdA and DdA are held in the registers REG60 and REG61, by asserting the torque correction enable signal AEN and negating the torque correction enable signal PEN. GdP and DdP are held in registers REG62 and REG63, by negating the torque correction enable signal AEN and asserting the torque correction enable signal PEN. Then, the torque correction coefficient KcrAP is calculated using the held values, by asserting both of the torque correction enable signals AEN and PEN.

As described above, the invention accomplished by the present inventors has been concretely explained based on the embodiments. However, the present invention is not restricted to the embodiments as described above, and it can be changed variously in the range that does not deviate from the gist. For example, the embodiments described above are explained in detail, in order to explain the present invention plainly, and the present invention is not necessarily restricted to one that includes all the explained configurations. It is possible to replace some configuration of a certain embodiment with the configuration of other embodiment, and it is possible to add the configuration of other embodiment to the configuration of a certain embodiment. It is also possible to make addition, deletion, and substitution of other configurations to some configuration of each embodiment.

For example, the system according to the embodiments is applicable as a drive method for not only the HDD device but also for various kinds of motors. The concrete examples include a DVD player/recorder, a Blu-ray disk player/recorder. Also in the inverter system of an air-conditioner, the present system can be applied as the technology of reducing oscillation and noise at the time of the steady rotation of the motor included therein.

What is claimed is:

1. A motor driving device to drive a three-phase motor provided externally, the motor driving device comprising:
    an inverter including three pairs of high-side transistors and low-side transistors respectively coupled to drive terminals of the three-phase motor, and to apply respectively drive voltages serving as three-phase sine waves to the drive terminals of the three-phase motor using a PWM (Pulse Width Modulation) signal;
    a current control loop to detect a drive current of the motor, to detect an error between the detected value of the drive current and a current indication value as a target value of the drive current, and to determine the duty of the PWM signal reflecting the error concerned;
    a back EMF phase detector to detect the phase of a back electromotive force of each phase in the motor; and
    a torque correction unit to calculate a first torque correction coefficient of a periodic function based on phase variations in the three phases of the back electromotive force, and to correct the current indication value by superimposing the first torque correction coefficient on the current indication value.

2. The motor driving device according to claim 1, wherein the first torque correction coefficient is a periodic function having a frequency twice the frequency of the back electromotive force, and having the amplitude and the phase changing with the phase variations in the three phases of the back electromotive force.

3. The motor driving device according to claim 2, further comprising:
    a drive voltage phase generator to determine the drive voltage phase for each of the three phases at the time of applying the drive voltage to the motor drive terminal, so as to match the phase of the back electromotive force and the phase of the drive current for every phase of the motor.

4. The motor driving device according to claim 1, further comprising:
a back EMF amplitude detector to detect the amplitude of the back electromotive force of each phase in the motor,
wherein the torque correction unit calculates further a second torque correction coefficient of a periodic function based on amplitude variations in the three phases of the back electromotive force, and corrects the current indication value by superimposing the second torque correction coefficient on the current indication value.

5. The motor driving device according to claim 4,
wherein the first torque correction coefficient is a periodic function having a frequency twice the frequency of the back electromotive force, and having the amplitude and the phase changing with the phase variations in the three phases of the back electromotive force, and
wherein the second torque correction coefficient is a periodic function having a frequency twice the frequency of the back electromotive force, and having the amplitude and the phase changing with the amplitude variations in the three phases of the back electromotive force.

6. The motor driving device according to claim 5,
wherein the torque correction unit comprises:
a first arithmetic unit to calculate the first torque correction coefficient;
a second arithmetic unit to calculate the second torque correction coefficient;
a first selection circuit to select whether to superimpose the first torque correction coefficient calculated by the first arithmetic unit on the current indication value; and
a second selection circuit to select whether to superimpose the second torque correction coefficient calculated by the second arithmetic unit on the current indication value.

7. The motor driving device according to claim 5,
wherein the torque correction unit comprises:
a third arithmetic unit to calculate a first function including a first parameter and a second parameter;
a fourth arithmetic unit to calculate a second function including the first parameter and the second parameter;
a third selection circuit to select whether, defining one phase among the three phases as a reference phase, to set the phase variations between the other two phases and the reference phase as the first parameter and the second parameter, respectively, or to set the amplitude variations between the other two phases and the reference phase as the first parameter and the second parameter, respectively;
a first arithmetic unit to calculate the first torque correction coefficient by calculating a periodic function having a frequency twice the frequency of the back electromotive force, an amplitude reflecting the operation result of the third arithmetic unit, and a phase reflecting the operation result of the fourth arithmetic unit; and
a second arithmetic unit to calculate the second torque correction coefficient by calculating a periodic function having a frequency twice the frequency of the back electromotive force, an amplitude reflecting the operation result of the third arithmetic unit, and a phase reflecting the operation result of the fourth arithmetic unit.

8. The motor driving device according to claim 4 further comprising:
a PLL controller to generate a timing signal synchronizing with the phase of the back electromotive force by PLL (Phase Locked Loop) control,
wherein the back EMF phase detector detects the phase of the back electromotive force, by performing multiple samplings of the voltage of the motor drive terminal in chronological order in a first period and detecting the timing when the sampling voltage concerned passes a voltage zero crossing point, in the state where the motor drive terminal of the detection target phase among the three phases is set as the high impedance in the first period,
wherein the back EMF amplitude detector calculates a difference of voltages in two predetermined samplings among the multiple samplings obtained by the back EMF phase detector, and detects the calculated difference concerned as the amplitude of the back electromotive force, and
wherein the first period is the range of the predetermined electrical angle based on the timing signal generated by the PLL controller.

9. A motor driving device to drive a three-phase motor provided externally, the motor driving device comprising:
an inverter including three pairs of high-side transistors and low-side transistors respectively coupled to drive terminals of the three-phase motor, and to apply respectively drive voltages serving as three-phase sine waves to the drive terminals of the three-phase motor using a PWM (Pulse Width Modulation) signal;
a current control loop to detect a drive current of the motor, to detect an error between the detected value of the drive current and a current indication value as a target value of the drive current, and to determine the duty of the PWM signal reflecting the error concerned;
a back EMF amplitude detector to detect the amplitude of the back electromotive force of each phase in the motor; and
a torque correction unit to calculate a torque correction coefficient of a periodic function based on amplitude variations in the three phases of the back electromotive force, and to correct the current indication value by superimposing the torque correction coefficient on the current indication value.

10. The motor driving device according to claim 9,
wherein the torque correction coefficient is a periodic function having a frequency twice the frequency of the back electromotive force, and having the amplitude and the phase changing with the amplitude variations in the three phases of the back electromotive force.

11. The motor driving device according to claim 10 further comprising:
a PLL controller to generate a timing signal synchronizing with the phase of the back electromotive force by PLL (Phase Locked Loop) control; and
a back EMF phase detector to detect the phase of the back electromotive force, by performing multiple samplings of the voltage of the motor drive terminal in chronological order in a first period and detecting the timing when the sampling voltage concerned passes a voltage zero crossing point, in the state where the motor drive terminal of the detection target phase among the three phases is set as the high impedance in the first period,
wherein the back EMF amplitude detector calculates a difference of voltages in two predetermined samplings among the multiple samplings obtained by the back EMF phase detector, and detects the calculated difference concerned as the amplitude of the back electromotive force, and wherein the first period is the range of the predetermined electrical angle based on the timing signal generated by the PLL controller.

12. The motor driving device according to claim 10 further comprising:
an inter-phase amplitude variation detector to detect amplitude variations in the three phases, by defining one phase among the three phases as a reference phase and calculating a ratio of the amplitude of the back electromotive force of the reference phase and the amplitude of the back electromotive force of the other two phases.

13. A motor system comprising:
a disk to store data;
a motor to rotate the disk; and
a motor driving device to drive the motor by three-phase sine waves,
wherein the motor driving device comprises:
an inverter including three pairs of high-side transistors and low-side transistors respectively coupled to drive terminals of the three-phase motor, and to apply respectively drive voltages serving as three-phase sine waves to the drive terminals of the three-phase motor using a PWM (Pulse Width Modulation) signal;
a current control loop to detect a drive current of the motor, to detect an error between the detected value of the drive current and a current indication value as a target value of the drive current, and to determine the duty of the PWM signal reflecting the error concerned;
a back EMF phase detector to detect a phase of a back electromotive force of each phase in the motor; and
a torque correction unit to correct the current indication value by calculating a first torque correction coefficient of a periodic function based on phase variations in three phases of the back electromotive force, and superimposing the first torque correction coefficient on the current indication value.

14. The motor system according to claim 13 further comprising:
a back EMF amplitude detector to detect an amplitude of the back electromotive force of each phase in the motor,
wherein the torque correction unit corrects the current indication value by calculating further a second torque correction coefficient of a periodic function based on the amplitude variations in the three phases of the back electromotive force, and superimposing the second torque correction coefficient on the current indication value.

15. The motor system according to claim 14,
wherein the first torque correction coefficient is a periodic function having a frequency twice the frequency of the back electromotive force, and having the amplitude and the phase changing with the phase variations in the three phases of the back electromotive force, and
wherein the second torque correction coefficient is a periodic function having a frequency twice the frequency of the back electromotive force, and having the amplitude and the phase changing with the amplitude variations in the three phases of the back electromotive force.

16. The motor system according to claim 13 further comprising:
a drive voltage phase generator to determine the drive voltage phase for each phase at the time of applying the drive voltage to the motor drive terminal, so as to match the phase of the drive current and the phase of the back electromotive force for each phase of the motor.

17. The motor system according to claim 15,
wherein the torque correction unit comprises:
a first arithmetic unit to calculate the first torque correction coefficient;
a second arithmetic unit to calculate the second torque correction coefficient;
a first selection circuit to select whether to superimpose the first torque correction coefficient calculated by the first arithmetic unit on the current indication value; and
a second selection circuit to select whether to superimpose the second torque correction coefficient calculated by the second arithmetic unit on the current indication value.

18. The motor system according to claim 15,
wherein the torque correction unit comprises:
a third arithmetic unit to calculate a first function including a first parameter and a second parameter;
a fourth arithmetic unit to calculate a second function including the first parameter and the second parameter;
a third selection circuit to select whether, defining one phase among the three phases as a reference phase, to set the phase variations between the other two phases and the reference phase as the first parameter and the second parameter, respectively, or to set the amplitude variations between the other two phases and the reference phase as the first parameter and the second parameter, respectively;
a first arithmetic unit to calculate the first torque correction coefficient by calculating a periodic function having a frequency twice the frequency of the back electromotive force, an amplitude reflecting the operation result of the third arithmetic unit, and a phase reflecting the operation result of the fourth arithmetic unit; and
a second arithmetic unit to calculate the second torque correction coefficient by calculating a periodic function having a frequency twice the frequency of the back electromotive force, an amplitude reflecting the operation result of the third arithmetic unit, and a phase reflecting the operation result of the fourth arithmetic unit.

19. The motor system according to claim 15,
wherein the disk is a hard disk.

* * * * *